US012568383B2

(12) United States Patent
Yu et al.

(10) Patent No.: US 12,568,383 B2
(45) Date of Patent: Mar. 3, 2026

(54) COMMUNICATION METHOD AND APPARATUS

(71) Applicant: HUAWEI TECHNOLOGIES CO., LTD., Shenzhen (CN)

(72) Inventors: Yawei Yu, Shenzhen (CN); Zhiheng Guo, Beijing (CN); Ruixiang Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 481 days.

(21) Appl. No.: 18/155,222

(22) Filed: Jan. 17, 2023

(65) Prior Publication Data

US 2023/0180024 A1 Jun. 8, 2023

Related U.S. Application Data

(63) Continuation of application No. PCT/CN2021/096962, filed on May 28, 2021.

(30) Foreign Application Priority Data

Jul. 17, 2020 (CN) .......................... 202010704568.7

(51) Int. Cl.
*H04W 16/28* (2009.01)
*H04W 72/0446* (2023.01)
(52) U.S. Cl.
CPC ....... *H04W 16/28* (2013.01); *H04W 72/0446* (2013.01)
(58) Field of Classification Search
None
See application file for complete search history.

(56) References Cited

U.S. PATENT DOCUMENTS 10,798,695 B2 10/2020 Kim et al.
2012/0236956 A1 9/2012 Zhang et al.
2022/0386353 A1* 12/2022 He ................... H04W 72/1263

FOREIGN PATENT DOCUMENTS

CN 108631960 A 10/2018
CN 110831218 A 2/2020
(Continued)

OTHER PUBLICATIONS

Zte, Consideration on long-PUCCH over slots. 3GPP TSG RAN WG1 NR Ad-Hoc#2, Qingdao, P.R. China Jun. 27 30, 2017, R1-1710116, 3 pages.

(Continued)

*Primary Examiner* — Walter J Divito
(74) *Attorney, Agent, or Firm* — HAUPTMAN HAM, LLP

(57) ABSTRACT

A communication method includes determining a third time unit and a fourth time unit. The third time unit includes all or a part of time units that are in at least one first time unit and that are used for transmission in a first transmission direction. A first signal is transmitted in the at least one first time unit in the first transmission direction based on a quantity of repeated transmissions. The fourth time unit is located after the at least one first time unit in a time domain, and the third time unit and the fourth time unit meet a requirement of transmitting the first signal based on the quantity of repeated transmissions. The method also includes repeatedly transmitting the first signal in the third time unit and the fourth time unit.

19 Claims, 8 Drawing Sheets

(56)                    References Cited

FOREIGN PATENT DOCUMENTS

| | | | |
|---|---|---|---|
| CN | 110958083 | A | 4/2020 |
| CN | 111225444 | A | 6/2020 |
| RU | 2699395 | C2 | 9/2019 |

OTHER PUBLICATIONS

China Telecom, Potential solutions for PUSCH coverage enhancements. 3GPP TSG RAN WG1 #101, e-Meeting, May 25-Jun. 5, 2020, R1-2003835, 9 pages.
3GPP TS 38.214 V16.1.0 (Mar. 2020), 3rd Generation Partnership Project; Technical Specification Group Radio Access Network; NR; Physical layer procedures for data(Release 16), 151 pages.
3GPP TS 38.331 V16.0.0 (Mar. 2020), 3rd Generation Partnership Project; Technical Specification Group Radio Access Network; NR; Radio Resource Control (RRC) protocol specification(Release 16), 835 pages.
3GPP TS 38.213 V16.1.0 (Mar. 2020), 3rd Generation Partnership Project; Technical Specification Group Radio Access Network; NR; Physical layer procedures for control(Release 16), 156 pages.
International Search Report issued in corresponding International Application No. PCT/CN2021/096962, dated Aug. 19, 2021, 10 pages.
Wilus Inc: "On PUSCH enhancement for NR URLLC", 3GPP Draft; R1-1911317 Oct. 8, 2019, XP051809315, total 8 pages.
Chinese Office Action issued in corresponding Chinese Application No. 202010704568.7, dated Nov. 25, 2023, pp. 1-9.
Extended European Search Report issued in corresponding European Application No. 21843014.8, dated Dec. 8, 2023, pp. 1-11.
Russian Office Action issued in corresponding Russian Application No. 2023103509/07(007686), dated Jun. 4, 2024, pp. 1-7.

* cited by examiner

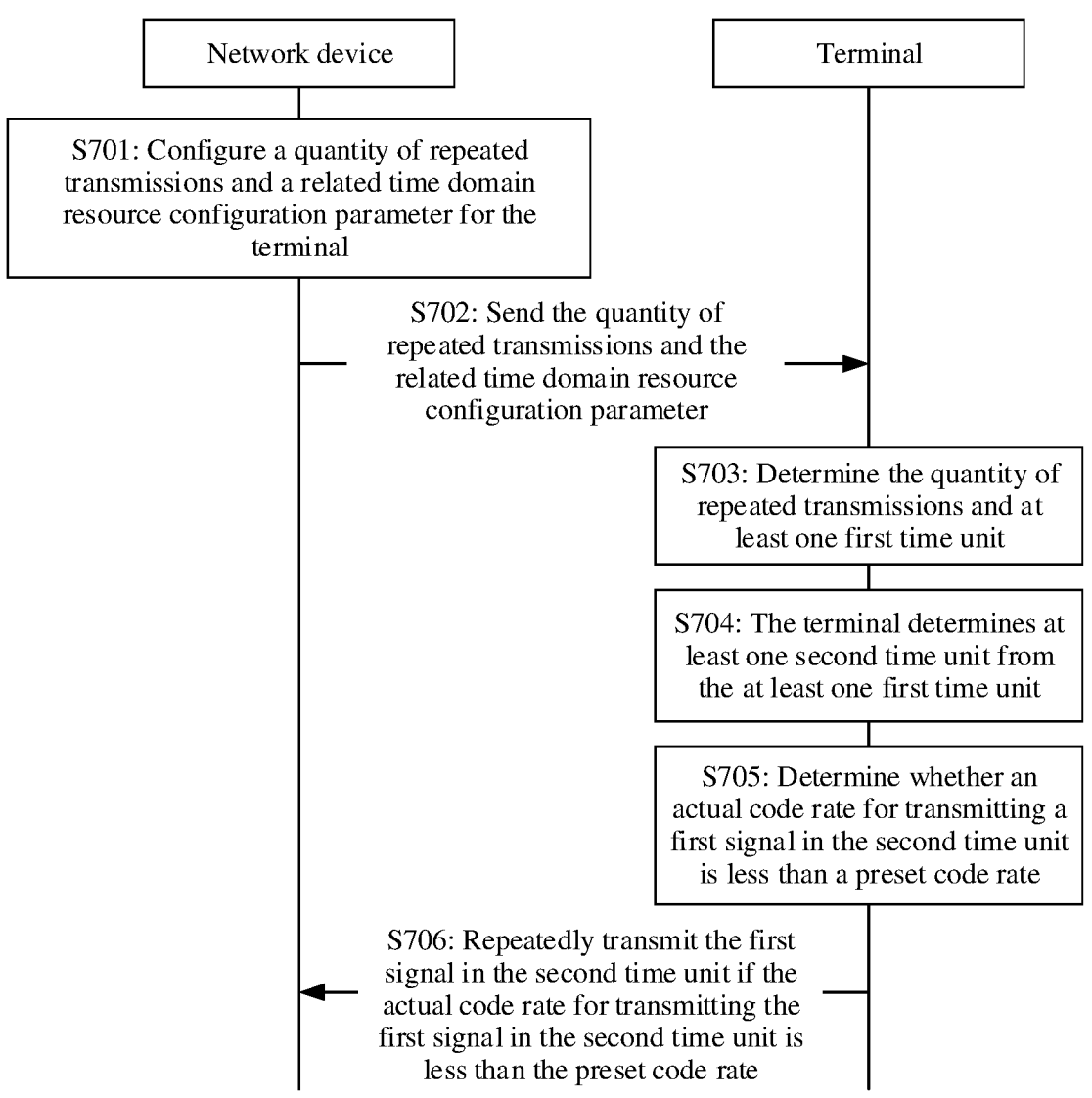

Network device

Terminal

S701: Configure a quantity of repeated transmissions and a related time domain resource configuration parameter for the terminal S702: Send the quantity of repeated transmissions and the related time domain resource configuration parameter S703: Determine the quantity of repeated transmissions and at least one first time unit S704: The terminal determines at least one second time unit from the at least one first time unit S705: Determine whether an actual code rate for transmitting a first signal in the second time unit is less than a preset code rate S706: Repeatedly transmit the first signal in the second time unit if the actual code rate for transmitting the first signal in the second time unit is less than the preset code rate

FIG. 7

COMMUNICATION METHOD AND APPARATUS

CROSS-REFERENCE TO RELATED APPLICATIONS

This application is a continuation of International Application No. PCT/CN2021/096962, filed on May 28, 2021, which claims priority to Chinese Patent Application No. 202010704568.7, filed on Jul. 17, 2020. The disclosures of the aforementioned applications are hereby incorporated by reference in their entireties.

TECHNICAL FIELD

This application relates to the field of wireless communication technologies, and in particular, to a communication method and apparatus.

BACKGROUND

In a wireless communication system, for example, a new radio (new radio, NR) communication system, information exchanged between a terminal and a network device is carried on a physical channel. Data, that is, uplink data, sent by the terminal is usually carried on a physical uplink shared channel (physical uplink shared channel, PUSCH). Control information, that is, uplink control information, sent by the terminal is usually carried on a physical uplink control channel (physical uplink control channel, PUCCH).

For some deep-coverage scenarios such as a cell edge or a basement, a path loss of radio signal propagation is very severe in wireless communication. In this case, coverage enhancement needs to be considered. For example, coverage enhancement is implemented by repeatedly sending data. In other words, the terminal repeatedly sends PUSCH data, and the network device combines the repeatedly sent data, to improve a cell coverage capability.

Currently, repeated uplink transmission is used as an example. An actual quantity of repeated transmissions performed by the terminal on resources configured by the network device is usually less than a quantity of repeated transmissions configured by the network device. As a result, a combination gain of a PUSCH received by the network device is low, limiting coverage enhancement performance.

SUMMARY

This application provides a communication method and apparatus, to improve coverage enhancement performance.

According to a first aspect, this application provides a communication method, which may be applied to a terminal or a network device in a wireless communication system. The method may include: obtaining at least one first time unit, where the at least one first time unit is configured to perform repeated transmission in a first transmission direction at a first location based on a quantity of repeated transmissions, the at least one first time unit includes at least one second time unit, and a time unit corresponding to the first location in the second time unit includes a time unit used for transmission in a second transmission direction; and if an actual code rate for transmitting a first signal in the second time unit is less than a preset code rate, transmitting the first signal in the second time unit.

The time unit may be understood as a time domain resource in time domain, for example, may be a subframe, a slot (slot), a mini-slot (mini-slot), or a symbol (symbol).

In this application, resources that cannot be originally used for repeated transmission in the first transmission direction are fully utilized, so that k repeated uplink transmissions of the first signal are completed in the at least one first time unit as much as possible. In this way, a good combination gain can be achieved after the first signal is received, thereby improving a coverage enhancement effect.

In some possible implementations, that the actual code rate for sending the first signal in the second time unit is less than the preset code rate specifically includes:

The preset code rate is a predefined code rate or a configured code rate, for example, the preset code rate is configured by using RRC signaling or by using DCI signaling; or the preset code rate is m times a code rate for repeatedly transmitting the first signal, where m is predefined, or is configured by using higher layer signaling or physical layer signaling.

Alternatively, a quantity of time-domain symbols included in the time unit corresponding to the first location is greater than or equal to a first threshold.

In some other possible implementations, the first threshold is a predefined quantity of time-domain symbols or a configured quantity of time-domain symbols, for example, the quantity of time-domain symbols is configured by using RRC signaling or DCI signaling; or the first threshold is a value $[n \times l]$ obtained by rounding n times a quantity l of time-domain symbols required for a single repeated transmission of the first signal, where n is a predefined value or is configured, and a rounding manner may be rounding up, rounding down, or rounding off.

In some other possible implementations, the first time unit is a slot, the second time unit is a slot, and a time unit that is in the second time unit and that is used in the first transmission direction includes at least one time-domain symbol.

In this application, the slot may be a slot, or may be a mini-slot.

In some other possible implementations, the first transmission direction is an uplink transmission direction, and the second transmission direction is a downlink transmission direction; or the first transmission direction is a downlink transmission direction, and the second transmission direction is an uplink transmission direction.

According to a second aspect, this application provides a communication method, which may be applied to a terminal or a network device in a wireless communication system. The method may include: determining a third time unit based on a transmission direction of at least one first time unit, where the at least one first time unit is configured to transmit a first signal in a first transmission direction based on a quantity of repeated transmissions, and the third time unit includes all or a part of time units that are in the at least one first time unit and that are used for transmission in the first transmission direction; repeatedly transmitting the first signal in the third time unit; and if the third time unit does not meet a requirement of transmitting the first signal based on the quantity of repeated transmissions, transmitting the first signal in a fourth time unit, where the fourth time unit is located after the at least one first time unit in time domain, and the third time unit and the fourth time unit meet the requirement of transmitting the first signal based on the quantity of repeated transmissions. For example, a quantity of time-domain symbols included in the third time unit and the fourth time unit is greater than or equal to a quantity of time-domain symbols required for transmitting the first signal based on the quantity of repeated transmissions.

The at least one first time unit may be understood as a time unit configured for the terminal to repeatedly transmit the first signal. The second time unit may be understood as a time unit actually used to repeatedly transmit the first signal to the network device, and the second time unit is a part of the at least one first time unit.

Optionally, the first time unit and the second time unit may be time units of a same granularity. For example, the first time unit is a slot, and the second time unit is also a slot. Alternatively, the first time unit and the second time unit may be time units of different granularities. The second time unit may be understood as a subunit of the first time unit. For example, the first time unit is a slot, and the second time unit is a symbol. Certainly, the first time unit may alternatively be a subframe, a mini-slot, or the like. Correspondingly, the second time unit may alternatively be a mini-slot, a slot, or a symbol. The second time unit is included in the at least one first time unit. This is not specifically limited in embodiments of this application.

In this application, when an actual quantity of repeated transmissions of the first signal in at least one configured first time unit does not reach k, repeated transmission in the first transmission direction may continue in the fourth time unit after the at least one first time unit in time domain, until the quantity of repeated transmissions reaches k. In this way, after the repeatedly transmitted first signal is received, a good combination gain can be achieved, thereby improving a coverage enhancement effect.

In some possible implementations, the determining a third time unit based on a transmission direction of at least one first time unit includes: determining a time unit that is in the at least one first time unit and whose transmission direction is the first transmission direction as the third time unit.

In some other possible implementations, the determining a third time unit based on a transmission direction of at least one first time unit includes: determining a time unit that is in the at least one first time unit and that meets a preset condition as the third time unit, where the preset condition includes: an actual code rate for transmitting the first signal in the first time unit is less than a preset code rate, a time unit corresponding to a first location in the first time unit includes a time unit used for transmission in a second transmission direction, and the time unit corresponding to the first location is configured to be used for repeated transmission in the first transmission direction; or a quantity of time units that are in the first time unit and that are used for transmission in the first transmission direction is greater than or equal to a first threshold.

The preset code rate is a predefined code rate or a configured code rate, for example, the preset code rate is configured by using RRC signaling or by using DCI signaling; or the preset code rate is m times a code rate for repeatedly transmitting the first signal, where m is predefined, or is configured by using higher layer signaling or physical layer signaling.

The first threshold may be a predefined quantity of time-domain symbols; or the first threshold may be a value $[n \times l]$ obtained by rounding n times a quantity $l$ of time-domain symbols required for a single transmission of the first signal, where n is a predefined value or configured by using signaling, and a rounding manner may be rounding up, rounding down, or rounding off.

In some other possible implementations, that the third time unit does not meet the requirement of transmitting the first signal based on the quantity of repeated transmissions includes: A quantity of third time units is less than or equal to a second threshold, where the second threshold is a quantity of time units required for transmitting the first signal based on the quantity of repeated transmissions, for example, $l \times k$.

In some other possible implementations, the determining a third time unit based on a transmission direction of at least one first time unit includes: obtaining first configuration information, where the first configuration information indicates a format of a time unit; and determining, based on the first configuration information, a first time unit in a first format in the at least one first time unit as the third time unit; or determining, based on the first configuration information, a first time unit in a second format in the at least one first time unit as the third time unit, where the first time units in the first format are all used in the first transmission direction, and the first time units in the second format are partially used in the first transmission direction.

In some other possible implementations, the first transmission direction is an uplink transmission direction, and the second transmission direction is a downlink transmission direction; or the first transmission direction is a downlink transmission direction, and the second transmission direction is an uplink transmission direction.

In some other possible implementations, before the transmitting the first signal in a fourth time unit, the method further includes: obtaining a first indication message, where the first indication message is used to configure transmission of the first signal in a time unit after the first time unit.

In some other possible implementations, before the transmitting the first signal in a fourth time unit, the method further includes: sending a second indication message, where the second indication message indicates to repeatedly transmit the first signal in the fourth time unit.

According to a third aspect, this application provides a communication apparatus. The apparatus may be a chip or a system on chip in a communication device (such as a terminal or a network device), or may be a functional module that is in the communication device and that is configured to implement the method according to any one of the first aspect or the possible implementations of the first aspect. For example, the communication apparatus includes: a first processing unit, configured to obtain at least one first time unit, where the at least one first time unit is configured to perform repeated transmission in a first transmission direction at a first location based on a quantity of repeated transmissions, the at least one first time unit includes at least one second time unit, and a time unit corresponding to the first location in the second time unit includes a time unit used for transmission in a second transmission direction; and a first transmission unit, configured to: if an actual code rate for transmitting a first signal in the second time unit is less than a preset code rate, transmit the first signal in the second time unit.

In some possible implementations, that the actual code rate for sending the first signal in the second time unit is less than the preset code rate specifically includes:

The preset code rate is a predefined code rate or a configured code rate, for example, the preset code rate is configured by using RRC signaling or by using DCI signaling; or the preset code rate is m times a code rate for repeatedly transmitting the first signal, where m is predefined, or is configured by using higher layer signaling or physical layer signaling.

Alternatively, a quantity of time-domain symbols included in the time unit corresponding to the first location is greater than or equal to a first threshold.

In some other possible implementations, the first threshold is a predefined quantity of time-domain symbols; or the first threshold is a value [n×l] obtained by rounding n times a quantity l of time-domain symbols required for a single transmission of the first signal, where n is a predefined value or configured by using signaling, and a rounding manner may be rounding up, rounding down, or rounding off.

In some other possible implementations, the first time unit is a slot, the second time unit is a slot, and a time unit that is in the second time unit and that is used in the first transmission direction includes at least one time-domain symbol.

In some other possible implementations, the first transmission direction is an uplink transmission direction, and the second transmission direction is a downlink transmission direction; or the first transmission direction is a downlink transmission direction, and the second transmission direction is an uplink transmission direction.

According to a fourth aspect, this application provides a communication apparatus. The apparatus may be a chip or a system on chip in a communication device (such as a terminal or a network device), or may be a functional module that is in the communication device and that is configured to implement the method according to any one of the second aspect or the possible implementations of the second aspect. For example, the communication apparatus includes: a second processing unit, configured to determine a third time unit based on a transmission direction of at least one first time unit, where the at least one first time unit is configured to transmit a first signal in a first transmission direction based on a quantity of repeated transmissions, and the third time unit includes all or a part of time units that are in the at least one first time unit and that are used for transmission in the first transmission direction; and a second transmission unit, configured to repeatedly transmit the first signal in the third time unit; and if the third time unit does not meet a requirement of transmitting the first signal based on the quantity of repeated transmissions, transmit the first signal in a fourth time unit, where the fourth time unit is located after the at least one first time unit in time domain, and the third time unit and the fourth time unit meet the requirement of transmitting the first signal based on the quantity of repeated transmissions.

In some possible implementations, the second processing unit is specifically configured to determine a time unit that is in the at least one first time unit and whose transmission direction is the first transmission direction as the third time unit.

In some other possible implementations, the second processing unit is specifically configured to determine a time unit that is in the at least one first time unit and that meets a preset condition as the third time unit, where the preset condition includes: an actual code rate for transmitting the first signal in the first time unit is less than a preset code rate, a time unit corresponding to a first location in the first time unit includes a time unit used for transmission in a second transmission direction, and the time unit corresponding to the first location is configured to be used for repeated transmission in the first transmission direction; or a quantity of time units that are in the first time unit and that are used for transmission in the first transmission direction is greater than or equal to a first threshold.

In some other possible implementations, that the third time unit does not meet the requirement of transmitting the first signal based on the quantity of repeated transmissions includes: A quantity of third time units is less than or equal to a second threshold, where the second threshold is a quantity of time units required for transmitting the first signal based on the quantity of repeated transmissions.

In some other possible implementations, the second processing unit is specifically configured to obtain first configuration information, where the first configuration information indicates a format of a time unit; and determine, based on the first configuration information, a first time unit in a first format in the at least one first time unit as the third time unit; or determine, based on the first configuration information, a first time unit in a second format in the at least one first time unit as the third time unit, where the first time units in the first format are all used in the first transmission direction, and the first time unit in the second format are partially used in the first transmission direction.

In some other possible implementations, the first transmission direction is an uplink transmission direction, and the second transmission direction is a downlink transmission direction; or the first transmission direction is a downlink transmission direction, and the second transmission direction is an uplink transmission direction.

In some other possible implementations, the second processing unit is further configured to obtain a first indication message before transmitting the first signal in the fourth time unit, where the first indication message is used to configure transmission of the first signal in a time unit after the first time unit.

In some other possible implementations, the second processing unit is further configured to send a second indication message, where the second indication message indicates to repeatedly transmit the first signal in the fourth time unit.

According to a fifth aspect, this application provides a communication device, including a non-volatile memory and a processor that are coupled to each other. The processor invokes program code stored in the memory to perform the communication method according to any one of the first aspect and the second aspect and the possible implementations of the first aspect and the second aspect.

In this application, the communication device may be a terminal or a network device in a wireless communication system.

According to a sixth aspect, this application provides a computer-readable storage medium. The computer-readable storage medium stores instructions. When the instructions are run on a computer, the computer is enabled to perform the communication method according to any one of the first aspect and the second aspect and the possible implementations of the first aspect and the second aspect.

According to a seventh aspect, this application provides a computer program or a computer program product. When the computer program or the computer program product is executed on a computer, the computer is enabled to perform the communication method according to any one of the first aspect and the second aspect or the possible implementations of the first aspect and the second aspect.

According to an eighth aspect, this application provides a communication method, which may be applied to a terminal or a network device in a wireless communication system. The method may include: determining a third time unit and a fourth time unit, where the third time unit includes all or a part of time units that are in at least one first time unit and that are used for transmission in a first transmission direction, the at least one first time unit is configured to transmit a first signal in the first transmission direction based on a quantity of repeated transmissions, the fourth time unit is located after the at least one first time unit in time domain, and the third time unit and the fourth time unit meet a requirement of transmitting the first signal based on the quantity of repeated transmissions; and repeatedly transmitting the first signal in the third time unit and the fourth time unit.

The at least one first time unit may be understood as a time unit configured for the terminal to repeatedly transmit the first signal. The third time unit and the fourth time unit may be understood as time units actually used to repeatedly transmit the first signal to the network device, and the third time unit is a part of the at least one first time unit.

In this application, when an actual quantity of repeated transmissions of the first signal in at least one configured first time unit does not reach k, repeated transmission in the first transmission direction may continue in the fourth time unit after the at least one first time unit in time domain, until the quantity of repeated transmissions reaches k. In this way, after the repeatedly transmitted first signal is received, a good combination gain can be achieved, thereby improving a coverage enhancement effect.

In some other possible implementations, the third time unit and the fourth time unit include k time units, redundancy versions RVs of a first signal transmitted in the k time units each are an RV in an RV sequence, and k is the quantity of repeated transmissions.

In some other possible implementations, an RV of the first signal transmitted in an $i^{th}$ time unit in the k time units is an $i^{th}$ RV in the RV sequence, and i is less than or equal to a total quantity of RVs in the RV sequence.

In some other possible implementations, the RV sequence is a predefined sequence or a sequence preconfigured by using higher layer signaling.

In some other possible implementations, the third time unit and the fourth time unit include k time units, frequency domain resources used to repeatedly transmit the first signal in the k time units are different, and k is the quantity of repeated transmissions.

In some other possible implementations, a location of a frequency domain resource used to repeatedly transmit the first signal in an $i^{th}$ time unit in the k time units satisfies the following formula:

$$RB_{start}(i) = \begin{cases} RB_{start} & i\bmod 2 = 0 \\ (RB_{start} + RB_{offset})\bmod N & i\bmod 2 = 1 \end{cases}$$

$RB_{start}$ is a start location of the frequency domain resource, $RB_{offset}$ is a frequency domain offset, $RB_{offset}$ is an integer greater than or equal to 0, N is a quantity of RBs of a bandwidth part, and i is less than or equal to the quantity of repeated transmissions.

In some other possible implementations, the method may further include: determining M consecutive first time units based on the third time unit and the fourth time unit, where M is greater than the quantity of repeated transmissions.

In some other possible implementations, the third time unit and the fourth time unit include k time units, and a first time unit in the M consecutive time units is a first time unit in the k time units or a first first time unit in the at least one first time unit. A last time unit in the M consecutive time units is a last time unit in the k time units or an $H^{th}$ time unit after the last time unit in the k time units, all time units from the last time unit in the k time units to the $H^{th}$ time unit are used in a second transmission direction, the second transmission direction is different from the first transmission direction, and H is a positive integer.

In some other possible implementations, the first transmission direction is an uplink transmission direction, and the second transmission direction is a downlink transmission direction; or the first transmission direction is a downlink transmission direction, and the second transmission direction is an uplink transmission direction.

In some other possible implementations, before the transmitting the first signal in the fourth time unit, the method further includes: obtaining a first indication message, where the first indication message is used to configure transmission of the first signal in a time unit after the first time unit.

In some other possible implementations, before the transmitting the first signal in the fourth time unit, the method further includes: sending a second indication message, where the second indication message indicates to repeatedly transmit the first signal in the fourth time unit.

According to a ninth aspect, this application provides a communication apparatus. The apparatus may be a chip or a system on chip in a communication device (such as a terminal or a network device), or may be a functional module that is in the communication device and that is configured to implement the method according to any one of the eighth aspect or the possible implementations of the eighth aspect. For example, the communication apparatus includes: a second processing unit, configured to determine a third time unit and a fourth time unit, where the third time unit includes all or a part of time units that are in at least one first time unit and that are used for transmission in a first transmission direction, the at least one first time unit is configured to transmit a first signal in the first transmission direction based on a quantity of repeated transmissions, the fourth time unit is located after the at least one first time unit in time domain, and the third time unit and the fourth time unit meet a requirement of transmitting the first signal based on the quantity of repeated transmissions; and a second transmission unit, configured to repeatedly transmit the first signal in the third time unit and the fourth time unit.

In some other possible implementations, the third time unit and the fourth time unit include k time units, redundancy versions RVs of a first signal transmitted in the k time units each are an RV in an RV sequence, and k is the quantity of repeated transmissions.

In some other possible implementations, an RV of the first signal transmitted in an $i^{th}$ time unit in the k time units is an $i^{th}$ RV in the RV sequence, and i is less than or equal to a total quantity of RVs in the RV sequence.

In some other possible implementations, the RV sequence is a predefined sequence or a sequence preconfigured by using higher layer signaling.

In some other possible implementations, the third time unit and the fourth time unit include k time units, frequency domain resources used to repeatedly transmit the first signal in the k time units are different, and k is the quantity of repeated transmissions.

In some other possible implementations, a location of a frequency domain resource used to repeatedly transmit the first signal in an $i^{th}$ time unit in the k time units satisfies the following formula:

$$RB_{start}(i) = \begin{cases} RB_{start} & i\bmod 2 = 0 \\ (RB_{start} + RB_{offset})\bmod N & i\bmod 2 = 1 \end{cases}$$

$RB_{start}$ is a start location of the frequency domain resource, $RB_{offset}$ is a frequency domain offset, $RB_{offset}$ is an integer greater than or equal to 0, N is a quantity of RBs of a bandwidth part, and i is less than or equal to the quantity of repeated transmissions.

In some other possible implementations, the second processing unit is further configured to determine M consecutive first time units based on the third time unit and the fourth time unit, where M is greater than the quantity of repeated transmissions.

In some other possible implementations, the third time unit and the fourth time unit include k time units, and a first time unit in the M consecutive time units is a first time unit in the k time units or a first first time unit in the at least one first time unit. A last time unit in the M consecutive time units is a last time unit in the k time units or an $H^{th}$ time unit after the last time unit in the k time units, all time units from the last time unit in the k time units to the $H^{th}$ time unit are used in a second transmission direction, the second transmission direction is different from the first transmission direction, and H is a positive integer.

In some other possible implementations, the first transmission direction is an uplink transmission direction, and the second transmission direction is a downlink transmission direction; or the first transmission direction is a downlink transmission direction, and the second transmission direction is an uplink transmission direction.

According to a tenth aspect, this application provides a communication device, including a non-volatile memory and a processor that are coupled to each other. The processor invokes program code stored in the memory to perform the communication method according to any one of the eighth aspect and the possible implementations of the eighth aspect.

In this application, the communication device may be a terminal or a network device in a wireless communication system.

According to an eleventh aspect, this application provides a computer-readable storage medium. The computer-readable storage medium stores instructions. When the instructions are run on a computer, the computer is enabled to perform the communication method according to any one of the eighth aspect and the possible implementations of the eighth aspect.

According to a twelfth aspect, this application provides a computer program or a computer program product. When the computer program or the computer program product is executed on a computer, the computer is enabled to implement the communication method according to any one of the eighth aspect or the possible implementations of the eighth aspect.

It should be understood that the technical solutions in the third to the seventh aspects of this application are consistent with that in the first aspect and the second aspect. Beneficial effects achieved in the various aspects and corresponding feasible implementations are similar. Details are not described again. It should be understood that the technical solutions in the ninth aspect to the twelfth aspect of this application are consistent with that in the eighth aspect. Beneficial effects achieved in the various aspects and corresponding feasible implementations are similar. Details are not described again.

BRIEF DESCRIPTION OF DRAWINGS

The following describes the accompanying drawings used in describing embodiments or the background of this application.

FIG. 7 is a schematic flowchart of yet still another method for repeated uplink transmission according to an embodiment of this application.

DESCRIPTION OF EMBODIMENTS

Figure 1:
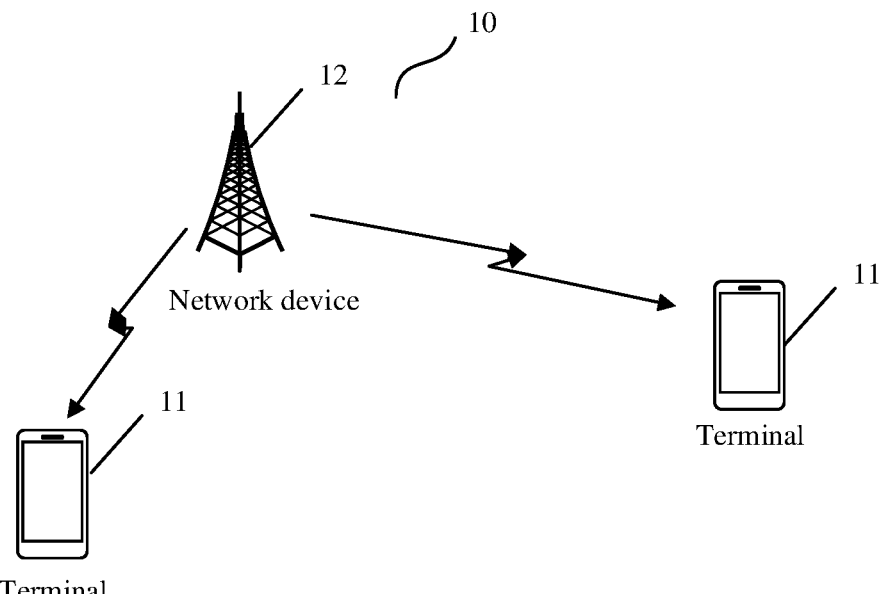
FIG. 1 is a schematic architectural diagram of a communication system according to an embodiment of this application.

The following describes embodiments of this application with reference to the accompanying drawings in embodiments of this application. In the following descriptions, reference is made to the accompanying drawings that form a part of this application and show specific aspects of embodiments of this application in an illustrative manner or in which specific aspects of embodiments of this application may be used. It should be understood that embodiments of this application may be used in other aspects, and may include structural or logical changes not depicted in the accompanying drawings. For example, it should be understood that the disclosure with reference to the described method may also be applied to a corresponding device or system for performing the method, and vice versa. For example, if one or more specific method steps are described, a corresponding device may include one or more units such as functional units for performing the described one or more method steps (for example, one unit performs the one or more steps; or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include one step for implementing functionality of one or more units (for example, one step for implementing functionality of one or more units; or a plurality of steps, each of which is for implementing functionality of one or more units in a plurality of units), even if such one or more of steps are not explicitly described or illustrated in the accompanying drawings. Further, it should be understood that features of various example embodiments and/or aspects described in this specification may be combined with each other, unless otherwise specified.

In a wireless communication system, for example, a new radio (new radio, NR) communication system, information exchanged between a terminal and a network device is carried on a physical channel. Data, that is, uplink data, sent by the terminal is usually carried on a physical uplink shared channel (physical uplink shared channel, PUSCH). Control information, that is, uplink control information, sent by the terminal is usually carried on a physical uplink control channel (physical uplink control channel, PUCCH). In addition, the terminal may further send a sounding reference signal (sounding reference signal, SRS). The network device estimates channel quality of the terminal at different frequencies by receiving the SRS of the terminal.

For some deep-coverage scenarios such as a cell edge or a basement, a path loss of radio signal propagation is very severe. In this case, coverage enhancement is required. Coverage enhancement may be implemented by repeatedly sending data. For example, the terminal repeatedly sends PUSCH data, and the network device combines the repeatedly sent data, to implement coverage enhancement.

Uplink transmission is used as an example. The network device configures, for the terminal, a time unit used for repeated transmission and a quantity of repeated transmissions, and indicates the time unit and the quantity of repeated transmissions to the terminal, so that the terminal may repeatedly send the PUSCH data to the network device in the time unit configured by the network device based on the quantity of repeated transmissions configured by the network device.

It should be noted that the time unit in embodiments of this application may be understood as a time domain resource in time domain, for example, may be a subframe, a slot (slot), a mini-slot (mini-slot), or a symbol (symbol). The time unit described in the following one or more embodiments is consistent with the description of the foregoing time unit. This is not specifically limited in embodiments of this application.

In embodiments of this application, the network device may indicate, to the terminal by using radio resource control (radio resource control, RRC) signaling or downlink control information (downlink control information, DCI), the configured time unit used for repeated transmission and the configured quantity of repeated transmissions.

For example, the network device may configure the quantity of repeated transmissions of the PUSCH data by using the following field in the RRC signaling:

ConfiguredGrantConfig::RepK={n1, n2, n4, n8}.

Alternatively, the network device may configure the quantity of repeated transmissions of the SRS by using the following field in the RRC signaling:

SRS-Resource::RepetitionFactor={n1, n2, n4}.

Alternatively, the network device may indicate the quantity of repeated transmissions by using an index of a time domain resource allocation (time domain resource allocation, TDRA) table in the DCI.

Further, the network device may further indicate, through the DCI, a time unit used for repeated transmission. Specifically, the network device may indicate, through the DCI, a start domain resource for a single transmission and a time length of a single transmission. The terminal may determine, based on a quantity of repeated transmissions, the start domain resource, and the time length, the time unit used for repeated transmission.

Certainly, the network device may alternatively indicate, in another manner, the time unit used for repeated transmission and the quantity of repeated transmissions. This is not specifically limited in embodiments of this application.

In this case, the terminal may determine, based on the indication of the RRC signaling or the DCI, the time unit used for repeated transmission, and then perform repeated uplink transmission in the time units based on the quantity of repeated transmissions. However, not all time units that are configured by the network device for the terminal and that are used for repeated transmission are used for repeated uplink transmission in an actual transmission process. Especially in a time division duplex (time domain duplex, TDD) system, because some time units are configured for transmission in a downlink transmission direction or some time units are occupied by burst data with a higher priority, an actual quantity of repeated transmissions performed by the terminal is less than a quantity k of repeated transmissions configured by the network device. Therefore, the network device can combine only received signals with a relatively small quantity of repeated transmissions, resulting in a small combination gain. This affects a coverage enhancement effect.

To resolve the problem that coverage enhancement performance is limited because the actual quantity of repeated transmissions is less than the configured quantity of repeated transmissions, an embodiment of this application provides a communication method. The method may be applied to a communication system. FIG. 1 is a schematic architectural diagram of a communication system according to this embodiment of this application. Refer to FIG. 1. The communication system 10 may include a terminal 11 and a network device 12.

The network device may be a communication apparatus that is on an access network side and that is configured to support the terminal in accessing a wireless communication system, and may be, for example, an evolved NodeB (evolved NodeB, eNB) in a communication system that supports a 4G access technology, or a next generation NodeB (next generation NodeB, gNB), a transmission reception point (transmission reception point, TRP), a relay node (relay node, RN), an access point (access point, AP), or the like in a communication system that supports a 5G access technology.

The terminal may be a communication apparatus that provides voice or data connectivity for a user, for example, may also be referred to as user equipment (user equipment, UE), a mobile station (mobile station), a subscriber unit (subscriber unit), a station (STAtion), or terminal equipment (terminal equipment, TE). The terminal may further be a cellular phone (cellular phone), a personal digital assistant (PDA, Personal Digital Assistant), a wireless modem (modem), a handheld (handheld) device, a laptop computer (laptop computer), a cordless phone (cordless phone), a wireless local loop (wireless local loop, WLL) station, a tablet computer (pad), or the like. With development of wireless communication technologies, any device that can access a wireless communication system, communicate with a network side of a wireless communication system, or communicate with another device by using a wireless communication system may be the terminal in embodiments of this application, such as a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. In embodiments of this application, the terminal may communicate with a network device, and a plurality of terminals may also communicate with each other. The terminal may be fixed or movable. The terminal or the communication device in embodiments of this application may alternatively be some apparatuses in any one of the foregoing devices, for example, a chip, a chip system, or a circuit structure.

First, the communication method provided in this embodiment of this application is described by using repeated uplink transmission as an example.

In this embodiment of this application, in a repeated uplink transmission scenario, a first communication device may be a terminal, a second communication device may be a network device, and repeated transmission is repeated sending. In a repeated downlink transmission scenario, a first communication device may be a network device, and a second communication device may be a terminal, and repeated transmission is repeated receiving.

Figure 2:
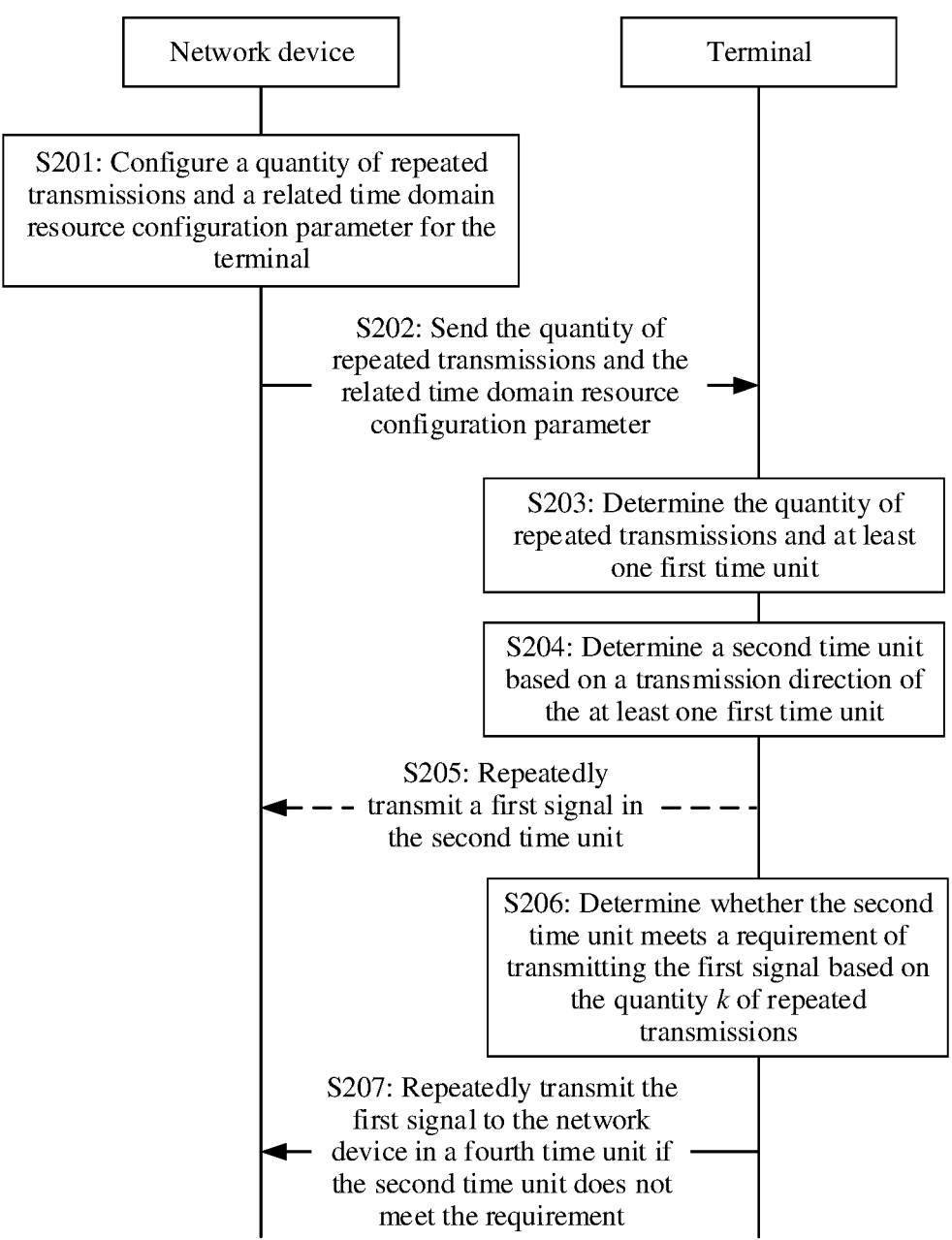
FIG. 2 is a schematic flowchart of a method for repeated uplink transmission according to an embodiment of this application.

FIG. 2 is a schematic flowchart of a method for repeated uplink transmission according to an embodiment of this application. As shown by solid lines in FIG. 2, the method may include the following steps.

S201: A network device configures a quantity of repeated transmissions and a related time domain resource configuration parameter for a terminal.

The quantity of repeated transmissions (denoted as k) may be understood as a quantity of repeated transmissions that the network device expects the terminal to perform. The related time domain resource configuration parameter may include a start location (denoted as s) of a time unit for a single transmission and a time length (denoted as l) of the single transmission. Certainly, the network device may further configure another configuration parameter related to repeated transmission for the terminal, for example, a PUSCH mapping type. This is not specifically limited in this embodiment of this application.

In some possible implementations, k may be indicated in the following manner: For a PUSCH scheduled for transmission based on a physical downlink control channel (physical downlink control channel, PDCCH), corresponding k may be configured by using higher layer signaling: a PUSCH aggregation factor (pusch-aggregationfactor). For a PUSCH scheduled for transmission based on a configured grant (configured grant), corresponding k may be configured by using ConfiguredGrantConfig::RepK in RRC signaling. For a PDSCH scheduled for transmission based on the configured grant, corresponding k may be configured by using pdsch-aggregationfactor in RRC signaling.

During actual application, a value range of k may be as follows. When k is configured by using pusch-aggregation-factor, there are three candidate values {2, 4, 8} of k. When the field is defaulted (that is, when the field does not exist), k is set to 1 by default. When k is configured by using ConfiguredGrantConfig::RepK, candidate values of k are {n1, n2, n4, n8} corresponding to 1, 2, 4, and 8 repetitions respectively.

Further, the related time domain resource configuration parameter may be indicated by using a TDRA field in DCI. Assuming that a value of the field is m, m+1 indicates a row index of a time domain resource allocation table, and information in the row specifically indicates the time domain resource configuration parameter.

During actual application, in correspondence to a first DCI format (format), the TDRA field has 4 bits in total. The terminal may obtain corresponding values of s and/from a predefined time domain resource allocation table based on the TDRA field, the first DCI format, a radio network temporary identifier (radio network temporary identifier, RNTI) scrambling type, and the like.

Alternatively, for another DCI format, the TDRA field in the DCI may have {0, 1, 2, 3, 4, 5} bits. A PUSCH-timeDomainResourceAllocation is selected from one PUSCH-timeDomainResourceAllocation list configured by a higher layer based on the TDRA field, and the selected PUSCH-timeDomainResourceAllocation includes start and length indicator values (start and length indicator values, SLIVs)={0, ..., 127}. The terminal may calculate values of s and/based on the SLIV by using the following code:

```
if (l−1) ≤ 7 then
    SLIV = 14(l−1)+s
else
    SLIV = 14(14−l+1)+(14−1−s)
    where 0 < l ≤ 14−s
```

Further, for different PUSCH mapping types, for values of s, l, or s+/, refer to the following Table 1.

TABLE 1

| PUSCH mapping type | Normal cyclic prefix (normal cyclic prefix) | | | Extended cyclic prefix (extended cyclic prefix) | | |
|---|---|---|---|---|---|---|
| | s | l | s + l | s | l | s + l |
| Type A (Type A) | 0 | {4, ..., 14} | {4, ..., 14} (Repeat Type A only) | 0 | {4, ..., 12} | {4, ..., 12} |
| Type B (Type B) | {0, ..., 13} | {1, ..., 14} | {1, ..., 14}, (Repeat Type A only) {1, ..., 27}, (Repeat Type B only) | {0, ..., 11} | {1, ..., 12} | {1, ..., 12} |

Certainly, the network device may alternatively indicate k, s, and l by using another configuration parameter. This is not specifically limited in this embodiment of this application.

S202: The network device sends the quantity of repeated transmissions and the related time domain resource configuration parameter to the terminal.

The network device sends the quantity of repeated transmissions and the related time domain resource configuration parameter that are configured to the terminal. For example, the network device includes the quantity of repeated transmissions and the related time domain resource configuration parameter that are configured in RRC signaling or DCI and sends the RRC signaling or the DCI to the terminal, to indicate s, l and k to the terminal.

S203: The terminal determines the quantity of repeated transmissions and at least one first time unit.

The at least one first time unit is configured to transmit a first signal in an uplink transmission direction (for example, a first transmission direction) based on a quantity k of repeated transmissions. In other words, the at least one first time unit may be understood as a time unit configured for the terminal to repeatedly transmit the first signal.

After receiving the quantity of repeated transmissions and the related time domain resource configuration parameter that are sent by the network device, the terminal may determine, based on s, l and k, at least one time unit that is configured by the network device for the terminal and that is used for repeated uplink transmission, that is, the at least one first time unit. For example, a time unit is a slot. If the PUSCH mapping type is Type A (Type A), the terminal may perform repeated transmission at first locations in k slots, where repeated PUSCH transmission in each slot occupies a same location of a time-domain symbol (that is, a symbol time window between s and s+l in each slot). If the PUSCH mapping type is Type B (Type B), the terminal may perform repeated transmission in a symbol time window between s and s+l×k.

It should be noted that, in this embodiment of this application, the first location is a time domain location used to transmit the first signal in the first time unit. For example, the first location is a location of a time-domain symbol that is configured by the network device for the terminal and that is used to repeatedly transmit the first signal in the first time unit when the PUSCH mapping type is Type A. For example, the first location may be a symbol time window between s and s+l in a slot. In this case, the terminal may repeatedly transmit the first signal in symbol time windows between s and s+l in the k slots.

S204: The terminal determines a second time unit (which may also be denoted as a third time unit) based on a transmission direction of the at least one first time unit.

The second time unit is a time unit that is all or a part of the at least one first time unit and that is used for transmission in the uplink transmission direction (that is, the first transmission direction). In other words, the second time unit may be understood as a time unit actually used to repeatedly transmit the first signal to the network device, and the second time unit is a part of the at least one first time unit.

Optionally, the first time unit and the second time unit may be time units of a same granularity. For example, the first time unit is a slot, and the second time unit is also a slot. Alternatively, the first time unit and the second time unit may be time units of different granularities. The second time unit may be understood as a subunit of the first time unit. For example, the first time unit is a slot, and the second time unit is a symbol. Certainly, the first time unit may alternatively be a subframe, a mini-slot, or the like. Correspondingly, the second time unit may alternatively be a mini-slot, a slot, or a symbol. The second time unit is included in the at least one first time unit. This is not specifically limited in this embodiment of this application.

In some possible embodiments, as shown by dashed line in FIG. 2, before S204, the method may further include:

S205: The terminal repeatedly transmits the first signal to the network device in at least one second time unit.

Herein, after determining the at least one first time unit in S203, the terminal may start to repeatedly transmit uplink data, namely, the first signal, to the network device in the at least one first time unit (for example, a slot). However, in a process in which the terminal repeatedly transmits the first signal, some time units (which may be slots or symbols) in the at least one first time unit are scheduled by a base station to transmit a second signal in a downlink transmission direction (a second transmission direction), or are scheduled by the base station to transmit a second signal with a higher priority in the uplink transmission direction. In this case, the terminal can repeatedly send the first signal only in a time unit that is in the at least one first time unit and that is used for the uplink transmission direction, that is, the terminal can repeatedly transmit the uplink data to the network device only in the second time unit.

In some possible implementations, because some time units in the at least one first time unit may be scheduled for transmission in the downlink transmission direction or for transmitting the second signal with the higher priority in the uplink transmission direction, after repeatedly transmitting the first signal to the network device in S204, the terminal may exclude, from the at least one first time unit, a time unit used for transmission in the downlink transmission direction and/or a time unit used for transmitting the second signal, to determine the second time unit, that is, a time unit actually used to repeatedly transmit the first signal. For example, it is assumed that the network device configures five slots (five first time units) for the terminal for transmission in the uplink transmission direction, and three of the five slots are scheduled for transmission in the downlink transmission direction. In this case, only two slots (that is, two second time units) are actually used for transmission in the uplink transmission direction, so that a quantity of second time units is less than a quantity of first time units. For another example, it is assumed that the network device configures two slots (two first time units, including 28 symbols in total) for the terminal for transmission in the uplink transmission direction, five symbols in the two slots are scheduled to transmit the second signal with the higher priority in the uplink transmission direction. In this case, only 23 symbols (that is, 23 second time units) are actually used to transmit the first signal in the uplink transmission direction, so that a quantity of second time units is less than a total quantity of subunits of the two first time units.

In some other possible implementations, in addition to configuring the at least one first time unit for the terminal, the network device further configures a transmission direction of each first time unit for the terminal. Therefore, before S204, the terminal may further obtain second configuration information, where the second configuration information indicates the transmission direction of each first time unit. Before performing S205, the terminal may further determine, in the at least one first time unit based on the second configuration information, first time units that are used for transmission in the uplink transmission direction and first time units that are used for transmission in the downlink transmission direction, to determine the at least one second time unit. For example, the terminal may determine, based on the second configuration information, all or a part of time units in the at least one first time unit that are used in the downlink transmission direction (the second transmission direction) as second time units, or determine, based on the second configuration information, all time units in the at least one first time unit that are used in the uplink transmission direction as second time units. Certainly, there may be another case. This is not specifically limited in this embodiment of this application. In this case, the terminal may determine the second time unit from the at least one first time unit, and then transmit the first signal in the second time unit (where for specific descriptions, refer to the following embodiment in FIG. 4).

S206: The terminal determines whether the second time unit meets a requirement of transmitting the first signal based on the quantity k of repeated transmissions. If the second time unit does not meet the requirement, S207 is performed, or if the second time unit meets the requirement, the procedure ends.

Herein, after ending transmitting the first signal in the second time unit, or before determining the second time unit from the at least one first time unit, the terminal may determine whether a quantity of time units required for transmitting the first signal based on the quantity of repeated transmissions is greater than a quantity of second time units, that is, determine whether the quantity of second time units is less than or equal to a second threshold. The second threshold herein is a quantity of time units required for transmitting the first signal based on the quantity k of repeated transmissions, that is l×k.

It should be noted that when the second time unit is a subunit of the first time unit, the quantity of time units required for transmitting the first signal based on the quantity of repeated transmissions may be understood as a total quantity of subunits of the first time unit that are occupied for repeatedly transmitting the first signal based on the configured quantity of repeated transmissions. For example, the first time unit is a slot. In this case, the quantity of time units required for repeatedly transmitting the first signal based on the quantity of repeated transmissions may be a total quantity of symbols occupied for repeatedly transmitting the first signal based on k. In this case, the second time unit may be a symbol.

After repeatedly transmitting the first signal to the network device in the second time unit in S205, the terminal may determine a time unit actually used to repeatedly transmit the first signal. Then, the terminal may determine whether a quantity of time units required for performing repeated transmission in the uplink transmission direction based on the configured quantity k of repeated transmissions is greater than the quantity of second time units. If the quantity of time units required for performing repeated transmission in the uplink transmission direction is greater than the quantity of second time units, it indicates that an actual quantity of repeated transmissions performed by the terminal does not reach k. In other words, the terminal cannot complete k repeated transmissions in the uplink transmission direction in the at least one first time unit configured by the network device for the terminal. In this case, the terminal needs to continue repeated transmission in the uplink transmission direction in another time unit (for example, a fourth time unit) after the at least one first time unit in time domain, until the quantity of repeated transmissions reaches k. Otherwise, it indicates that an actual quantity of repeated transmissions performed by the terminal reaches k. In other words, the terminal can complete k repeated transmissions in the uplink transmission direction in the at least one first time unit configured by the network device for the terminal, so that after the network device receives the repeatedly transmitted first signal, a good combination gain is achieved, thereby improving a coverage enhancement effect.

In some possible implementations, the third time unit may be a time unit that is located after the at least one first time unit in time domain, and the third time unit may be a time unit such as a subframe, a slot, a mini-slot, or a symbol. This is not specifically limited in this embodiment of this application.

Further, the third time unit may be a time unit configured by the network device for the terminal for uplink transmission or downlink transmission, or may be a time unit not configured by the network device for the terminal. This is not specifically limited in this embodiment of this application.

S207: The terminal repeatedly transmits the first signal to the network device in the fourth time unit after the at least one first time unit.

If the terminal cannot perform k repeated transmissions in the uplink transmission direction in the second time unit, the terminal may continue to repeatedly transmit the first signal to the network device in one or more time units (namely, the fourth time unit) after the at least one first time unit, until a quantity of times that the terminal repeatedly transmits the first signal to the network device in the second time unit and the fourth time unit reaches a configured quantity of time units for repeated transmission. Herein, it may be understood that the terminal repeatedly transmits the first signal to the network device in the second time unit and the fourth time unit, and a total quantity of second time units and fourth time units is greater than or equal to the quantity of time units required for transmitting the first signal based on the quantity of repeated transmissions. Alternatively, it may be understood that the terminal repeatedly transmits the first signal to the network device in the second time unit and the fourth time unit based on the configured quantity k of repeated transmissions.

Figure 3:
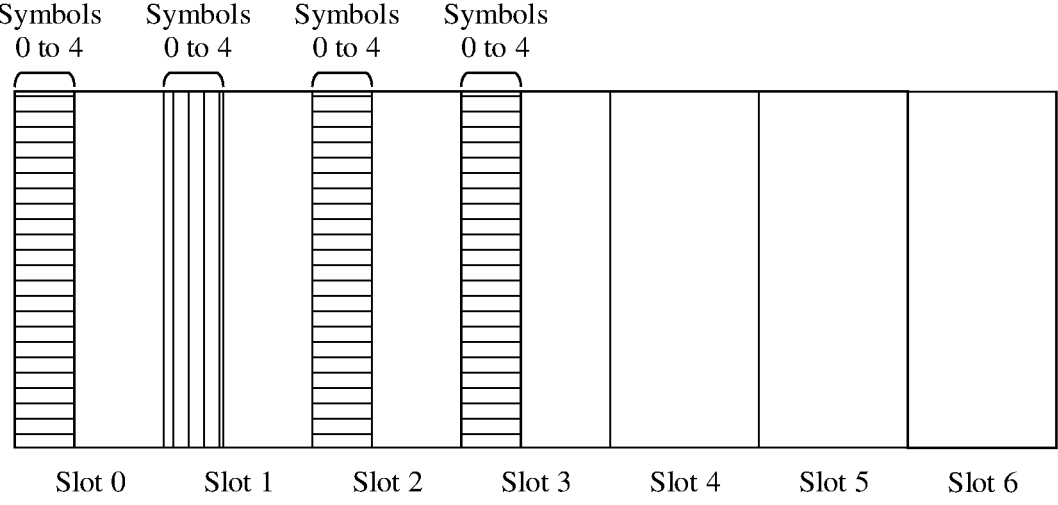
FIG. 3 is a schematic diagram of a time unit according to an embodiment of this application.

For example, FIG. 3 is a schematic diagram of a time unit according to an embodiment of this application. Refer to FIG. 3. The network device configures, for the terminal, that a PUSCH mapping type is Type A, s=symbol 0 in slot 0, l=5, and k=3. In other words, the network device indicates the terminal to perform three repeated transmissions in symbol 0 to symbol 4 in each of slot 0 to slot 2 (three slots in total). In this case, after receiving the foregoing configuration, the terminal may first determine at least one first time unit (namely, slot 0 to slot 2) and the quantity k of repeated transmissions being equal to 3, and then the terminal repeatedly transmits the first signal to the network device in slot 0 to slot 2. If symbols 2, 4, and 5 in slot 1 are scheduled for transmission in the downlink transmission direction, the terminal actually repeatedly transmits the first signal only in the second time units (namely, symbols 0 to 4 in slot 0 and symbols 0 to 4 in slot 2). It can be learned that the terminal actually repeatedly transmits the first signal to the network device twice in the second time unit, which does not reach k=3 configured by the network device. In other words, an actual quantity of repeated transmissions performed by the terminal is less than k. In this way, the terminal may repeatedly transmit the first signal to the network device in the fourth time unit (for example, symbol 0 to symbol 4 in slot 3) after the first time unit, so that the terminal repeatedly transmits the first signal to the network device in slot 0 to slot 3 for a total of three times. During actual application, the terminal may select slot 3 adjacent to a last first time unit (namely, slot 2) as the fourth time unit, or may select another slot, for example, slot 5 or slot 6. This is not specifically limited in this embodiment of this application.

In other embodiments of this application, in addition to configuring the at least one first time unit for the terminal, the network device further configures a transmission direction of each first time unit for the terminal. In this case, the terminal may further obtain first configuration information, where the first configuration information indicates the transmission direction of each first time unit. In other words, the terminal may determine, in the at least one first time unit based on the first configuration information, first time units that are used for transmission in the uplink transmission direction and first time units that are used for transmission in the downlink transmission direction.

Figure 4:
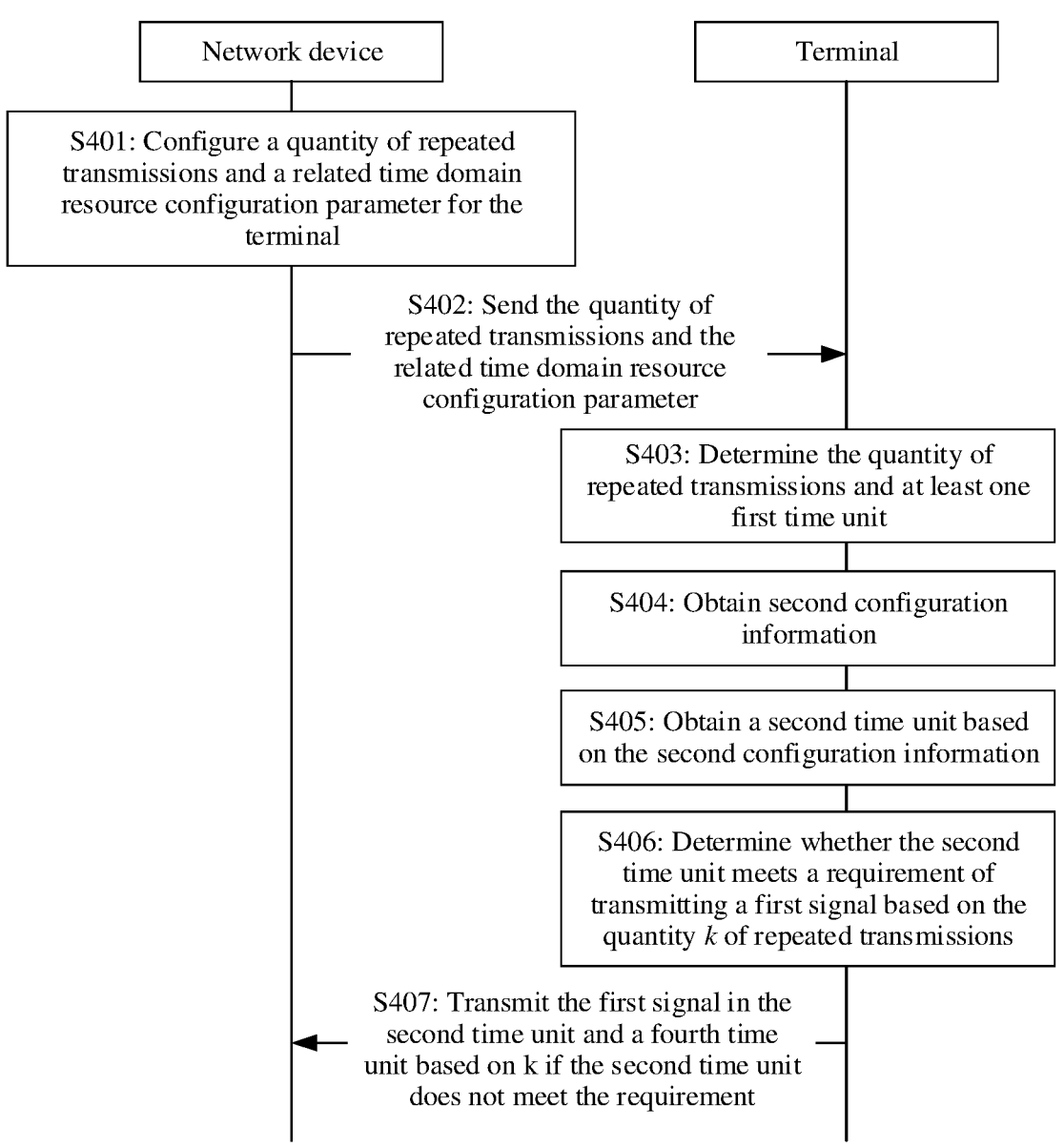
FIG. 4 is a schematic flowchart of another method for repeated uplink transmission according to an embodiment of this application.

Correspondingly, in some possible implementations, FIG. 4 is a schematic flowchart of another method for repeated uplink transmission according to an embodiment of this application. As shown in FIG. 4, the method may include the following steps.

S401: A network device configures a quantity of repeated transmissions and a related time domain resource configuration parameter for a terminal.

S402: The network device sends the quantity of repeated transmissions and the related time domain resource configuration parameter to the terminal.

S403: The terminal determines the quantity of repeated transmissions and at least one first time unit.

For S401 to S403, refer to the descriptions of S201 to S203 in the foregoing embodiment. Details are not described herein again.

S404: The terminal obtains second configuration information.

The second configuration information indicates a transmission direction corresponding to the first time unit.

In this embodiment of this application, the second configuration information may be configured by the network device for the terminal, or may be pre-negotiated by the network device and the terminal, or may be specified in a communication protocol. This is not specifically limited in this embodiment of this application. Certainly, the terminal may perform S404 in a process of performing S401 to S403, before performing S401 to S403, or after performing S401 to S403. This is not specifically limited in this embodiment of this application.

S405: The terminal excludes, from the first time unit based on the second configuration information, a fifth time unit used for transmission in a downlink transmission direction and/or a sixth time unit used for transmitting a second signal in an uplink transmission direction, to obtain a second time unit.

During actual application, the first configuration information may be a transmission direction of each time unit (that is, a format (format) of the time unit) in a TDD frame structure, that is, whether each time unit is used for transmission in the uplink transmission direction or the downlink transmission direction is configured, and is indicated to the terminal by using RRC signaling or DCI.

For example, the network device configures the time unit (for example, a slot) by using a TDD UL/DL common configuration TDD-UL-DL-ConfigCommon in RRC signaling. Configuration manners may be but are not limited to the following two manners.

Configuration Manner 1 (Pattern 1):

dl-UL-TransmissionPeridicity: A configuration periodicity of one slot is q milliseconds. Based on the configuration periodicity and a subcarrier spacing of each slot, a quantity of slots in a current periodicity can be determined as follows: $t = q \times 2^{\mu}$, where $\mu$ indicates the subcarrier spacing.

nrofDownlinkSlots: A value thereof is $d_{slots}$. To be specific, it is determined that the first $d_{slots}$ slots in current t slots are slots used for transmission in the downlink transmission direction.

nrofDownlinkSymbols: A value thereof is $d_{sym}$. To be specific, it is determined that $d_{sym}$ consecutive symbols after $d_{slots}$ slots used for transmission in the downlink transmission direction are time-domain symbols used for transmission in the downlink transmission direction.

nrofUplinkSlots: A value thereof is $u_{slots}$. To be specific, it is determined that the last $u_{slots}$ slots in the current t slots are slots used for transmission in the uplink transmission direction.

nrofUplinkSymbols: A value thereof is $u_{sym}$. To be specific, it is determined that $u_{sym}$ symbols before $u_{slots}$ slots used for transmission in the uplink transmission direction are time-domain symbols used for uplink transmission.

In the foregoing manner, after the terminal may determine that some of the t slots are slots used for transmission in the uplink transmission direction, slots used for transmission in the downlink transmission direction, symbols used for transmission in the uplink transmission direction, and symbols used for transmission in the downlink transmission direction, whether remaining x time-domain symbols are used for transmission in the uplink transmission direction or the downlink transmission direction cannot be determined.

$x = (t - d_{slots} - u_{slots}) \times N_{symb1}^{slot} - d_{sym} - u_{sym}$, where $d_{sym}$ indicates a quantity of time-domain symbols included in each slot for scheduling a PUSCH, and the x time-domain symbols may be referred to as flexible symbols (flexible time-domain symbols).

Configuration Manner 2 (Pattern 2):

Functions of parameter setting in pattern 2 are similar to that of parameter setting in pattern 1. That is, transmission formats of some slots in a specific time period are configured in pattern 1, and transmission formats of some slots in another time period are configured in pattern 2.

After a frame structure of each slot in the TDD frame structure in a time period is determined by using tdd-UL-DL-ConfigurationCommon, if UE is further configured with a TDD UL/DL dedicated configuration: a tdd-UL-DL-ConfigurationDedicated parameter, the parameter continues to define uplink and downlink transmission purposes of the flexible symbols. A specific parameter configuration of the parameter tdd-UL-DL-ConfigurationDedicated is as follows:

slotSpecificConfigurationsToAddModList: a set of configured slots;

slotIndex: an index value of a slot in the set of configured slots;

symbols=allDownlink: indicating that all time-domain symbols of the indicated slot are time-domain symbols used for transmission in the downlink transmission direction;

symbols=allUplink: indicating that all time-domain symbols of the indicated slot are time-domain symbols used for transmission in the uplink transmission direction; and symbols=explicit: using nfofDownlinkSymbols to configure the first nfofDownlinkSymbols time-domain symbols in a current slot as time-domain symbols used for transmission in the downlink transmission direction, using nfofUplinkSymbols to configure the last nfofUplinkSymbols time-domain symbols in the current slot as time-domain symbols used for transmission in the uplink transmission direction, and using remaining time-domain symbols as flexible symbols (flexible time-domain symbols).

It can be learned that, the terminal may determine, in the at least one first time unit based on the second configuration information, first time units that are used for transmission in the uplink transmission direction and first time units that are used for transmission in the downlink transmission direction. The terminal may determine, as the second time unit, a time unit remaining after the fifth time unit (which may be a slot or may be a symbol) used for transmission in a second transmission direction is excluded from the first time unit. In other words, the terminal excludes, from the first time unit, a time unit (namely, the sixth time unit) used for transmission in the downlink transmission direction, and determines a remaining time unit as the second time unit.

In some possible implementations, if the fifth time unit is the slot, the fifth time unit may be the first time unit (slot) completely or partially used for transmission in the downlink transmission direction. It may be understood that, the first time unit completely used for transmission in the downlink transmission direction means that all subunits (symbols) in the first time unit are configured for transmission in the downlink transmission direction, for example, symbols=allDownlink. The first time unit partially used for transmission in the downlink transmission direction means that one or more subunits (symbols) in the first time unit are configured for transmission in the downlink transmission direction, for example, symbols=explicit. nfofDownlinkS-
ymbols is used to configure the first nfofDownlinkSymbols
time-domain symbols in the current slot as time-domain
symbols used for transmission in the downlink transmission
direction. For example, if a slot includes a symbol used for
transmission in the uplink transmission direction, the slot is
used for transmission in the uplink transmission direction; or
if a slot includes a symbol used for transmission in the
downlink transmission direction or all symbols are used for
transmission in the downlink transmission direction, the slot
is used for transmission in the downlink transmission direc-
tion.

Then S406 is performed: The terminal determines
whether the second time unit meets a requirement of trans-
mitting a first signal based on a quantity k of repeated
transmissions. If the second time unit does not meet the
requirement, S407 is performed, or if the second time unit
meets the requirement, the procedure ends.

S407: The terminal transmits the first signal to the net-
work device in the second time unit and a fourth time unit
after the at least one first time unit based on the quantity k
of repeated transmissions.

For S406 and S407, refer to the descriptions of S206 and
S207 in the foregoing embodiment. Details are not described
herein again.

It should be noted that, after obtaining the second con-
figuration information in S404, the terminal can determine a
transmission direction of each time unit in the at least one
first time unit based on the second configuration informa-
tion. In this case, the terminal may determine, before repeat-
edly transmitting the first signal, a second time unit actually
used for transmission in the uplink transmission direction, to
determine whether a quantity of time units, that is, l×k time
units, required for repeated transmission in the uplink trans-
mission direction based on the configured quantity k of
repeated transmissions is greater than a quantity of second
time units. If yes, it indicates that an actual quantity of
repeated transmissions performed by the terminal cannot
reach k. In other words, the terminal cannot complete k
repeated transmissions in the uplink transmission direction
in the at least one first time unit configured by the network
device for the terminal. In this case, the terminal needs to
continue repeated transmission in the uplink transmission
direction in the second time unit and another time unit (the
fourth time unit) after the at least one time unit, until the
quantity of repeated transmissions reaches k. Otherwise, it
indicates that an actual quantity of repeated transmissions
performed by the terminal may reach k. In other words, the
terminal can complete k repeated transmissions in the uplink
transmission direction in the at least one first time unit
configured by the network device for the terminal, so that
after the network device receives the repeatedly transmitted
first signal, a good combination gain is achieved, thereby
improving a coverage enhancement effect.

For example, still refer to FIG. 3. The network device
configures, for the terminal, that a PUSCH mapping type is
Type A, s=symbol 0 in slot 0, l=5, and k=3. In other words,
the network device indicates the terminal to perform three
repeated transmissions in symbol 0 to symbol 4 in each of
slot 0 to slot 2 (three slots in total). In this case, after
receiving the foregoing configuration, the terminal may first
determine at least one first time unit (namely, slot 0 to slot
2) and the quantity k of repeated transmissions being equal
to 3, and then the terminal obtains the second configuration
information configured by the network device. The second
configuration information indicates that symbols 2, 4, and 5
in slot 1 are used for transmission in the downlink transmission direction. Then, the terminal excludes slot 1 based
on the first configuration information, to obtain second time
units (namely, slot 0 and slot 2). Slot 0 and slot 2 are used
for transmission in the uplink transmission direction. Next,
the terminal determines that if a quantity of symbols
required for transmitting the first signal based on the con-
figured quantity of repeated transmissions, that is, l×k=15, is
greater than the quantity of second time units (that is, 10), in
other words, the terminal can repeatedly transmit the first
signal to the network device only twice in slot 0 to slot 3,
which does not reach k=3 configured by the network device,
an actual quantity of repeated transmissions performed by
the terminal is less than k. In this way, the terminal may
repeatedly transmit the first signal to the network device in
the fourth time unit (for example, symbol 0 to symbol 4 in
slot 3) after the first time unit, so that the terminal repeatedly
transmits the first signal to the network device in slot 0 to
slot 3 for a total of three times. During actual application, the
terminal may select slot 3 adjacent to a last first time unit
(namely, slot 2) as the fourth time unit, or may select another
slot, for example, slot 5 or slot 6. This is not specifically
limited in this embodiment of this application.

Further, it can be learned from the foregoing that the first
time unit may have two formats. For example, the first time
unit is a slot, and the format of the first time unit is a slot
format. The first time units in a first format are all used for
transmission in the downlink transmission direction, and the
first time units in a second format are partially used for
transmission in the downlink transmission direction. To
flexibly configure transmission resources, when performing
S405, the terminal may determine a first time unit in a
specific format as the fifth time unit based on a configura-
tion. In this case, the method may further include: The
terminal obtains first configuration information, where the
first configuration information indicates a format of the first
time unit. The terminal determines a first time unit in the first
format in the at least one first time unit as the fifth time unit
based on the first configuration information, or determines,
based on the first configuration information, a first time unit
in the second format in the at least one first time unit as the
fifth time unit. In other words, if both the first time unit in
the first format and the first time unit in the second format
exist in the at least one first time unit, when determining the
second time unit, the terminal may perform selection based
on the first configuration information, to exclude the first
time unit in the first format or exclude the first time unit in
the second format, to determine the second time unit.

During actual application, the first configuration informa-
tion may be sent by the network device to the terminal.
Specifically, the network device may send the first configu-
ration information to the terminal by using RRC signaling or
DCI. For example, the first configuration information may
be 1 bit in the RRC signaling or the DCI, and indicates the
format of the first time unit.

For example, still refer to FIG. 3. The network device
configures, for the terminal, that a PUSCH mapping type is
Type A, s=symbol 0 in slot 0, l=5, and k=3. In other words,
the network device indicates the terminal to perform three
repeated transmissions in symbol 0 to symbol 4 in each of
slot 0 to slot 2 (three slots in total).

The network device indicates, by using the 1 bit in the
DCI, that the slot format is the second format (that is, the
first time unit is partially used for transmission in the
downlink transmission direction). In this case, after receiv-
ing the foregoing configuration, the terminal may first deter-
mine at least one first time unit (namely, slot 0 to slot 2) and
the quantity k of repeated transmissions being equal to 3, and the terminal obtains the first configuration information and the second configuration information that are configured by the network device. The second configuration information indicates that symbols 2, 4, and 5 in slot 1 are used for transmission in the downlink transmission direction, and the first configuration information indicates that the slot format is the second format. The terminal excludes slot 1 based on the first configuration information and the second configuration information, to obtain second time units (namely, slot 0 and slot 2). Slot 0 and slot 2 are used for transmission in the uplink transmission direction. Next, the terminal determines that if a quantity of symbols required for transmitting the first signal based on the configured quantity of repeated transmissions, that is, l×k=15, is greater than the quantity of second time units (that is, 10), in other words, the terminal can repeatedly transmit the first signal to the network device only twice in slot 0 to slot 3, which does not reach k=3 configured by the network device, an actual quantity of repeated transmissions performed by the terminal is less than k. In this way, the terminal may repeatedly transmit the first signal to the network device in the fourth time unit (for example, symbol 0 to symbol 4 in slot 3) after the first time unit, so that the terminal repeatedly transmits the first signal to the network device in slot 0 to slot 3 for a total of three times. During actual application, the terminal may select slot 3 adjacent to a last first time unit (namely, slot 2) as a third time unit, or may select another slot, for example, slot 5 or slot 6. This is not specifically limited in this embodiment of this application.

Alternatively, the network device indicates, by using the 1 bit in the DCI, that the slot format is the first format (that is, the first time unit is completely used for transmission in the downlink transmission direction). In this case, after receiving the foregoing configuration, the terminal may first determine at least one first time unit (namely, slot 0 to slot 2) and the quantity k of repeated transmissions being equal to 3, and the terminal obtains the first configuration information and the second configuration information that are configured by the network device. The second configuration information indicates that all symbols in slot 1 are used for transmission in the downlink transmission direction, symbol 7 to symbol 9 in slot 2 are used for transmission in the downlink transmission direction, and the first configuration information indicates that the slot format is the first format. The terminal excludes slot 1 based on the first configuration information and the second configuration information, to obtain second time units (namely, slot 0 and slot 2). Slot 0 and slot 2 are used for transmission in the uplink transmission direction. Next, the terminal determines that if a quantity of symbols required for transmitting the first signal based on the configured quantity of repeated transmissions, that is, l×k=15, is greater than the quantity of second time units (that is, 10), in other words, the terminal can repeatedly transmit the first signal to the network device only twice in slot 0 to slot 3, which does not reach k=3 configured by the network device, an actual quantity of repeated transmissions performed by the terminal is less than k. In this way, the terminal may repeatedly transmit the first signal to the network device in the fourth time unit (for example, symbol 0 to symbol 4 in slot 3) after the first time unit, so that the terminal repeatedly transmits the first signal to the network device in slot 0 to slot 3 for a total of three times. During actual application, the terminal may select slot 3 adjacent to a last first time unit (namely, slot 2) as the fourth time unit, or may select another slot, for example, slot 5 or slot 6. This is not specifically limited in this embodiment of this application.

In this way, the process of repeated uplink transmission is completed.

In some possible implementations, in a scenario in which the network device configures time units for a plurality of terminals, to implement flexible scheduling of the terminals, the network device may further enable different transmission functions for different terminals. For example, the network device may configure a function of performing repeated transmission in a fourth time unit for a terminal A, but the network device does not configure the function for a terminal B. In other words, the network device enables the function of performing repeated transmission in the fourth time unit for the terminal A, but does not enable the function for the terminal B. In this case, before S205 or S407, the method may further include: The terminal obtains a first indication message sent by the network device, where the first indication message is used to configure the terminal to transmit the first signal in a time unit after the first time unit. In this way, as described in the foregoing embodiment, when a quantity of repeated transmissions performed by the terminal in the at least one first time unit does not reach k, repeated transmission may be continued in the fourth time unit.

In some possible implementations, the terminal may determine whether to enable a function of performing repeated transmission in the fourth time unit. If the terminal enables the function, after S205 or S407, the method may further include: The terminal sends a second indication message to the network device, where the second indication message indicates the terminal to repeatedly transmit the first signal in the fourth time unit. To be specific, if the terminal enables the function of performing repeated transmission in the fourth time unit, after completing repeated transmission of the first signal in S205 or S407, the terminal sends the second indication message to the network device, to notify the network device that the terminal also repeatedly transmits the first signal in the fourth time unit. In this way, the network device knows that in addition to receiving the first signal in the second time unit, the network device further needs to receive the first signal in the fourth time unit.

In addition, the communication method provided in this embodiment of this application is described by using repeated downlink transmission as an example.

Figure 5:
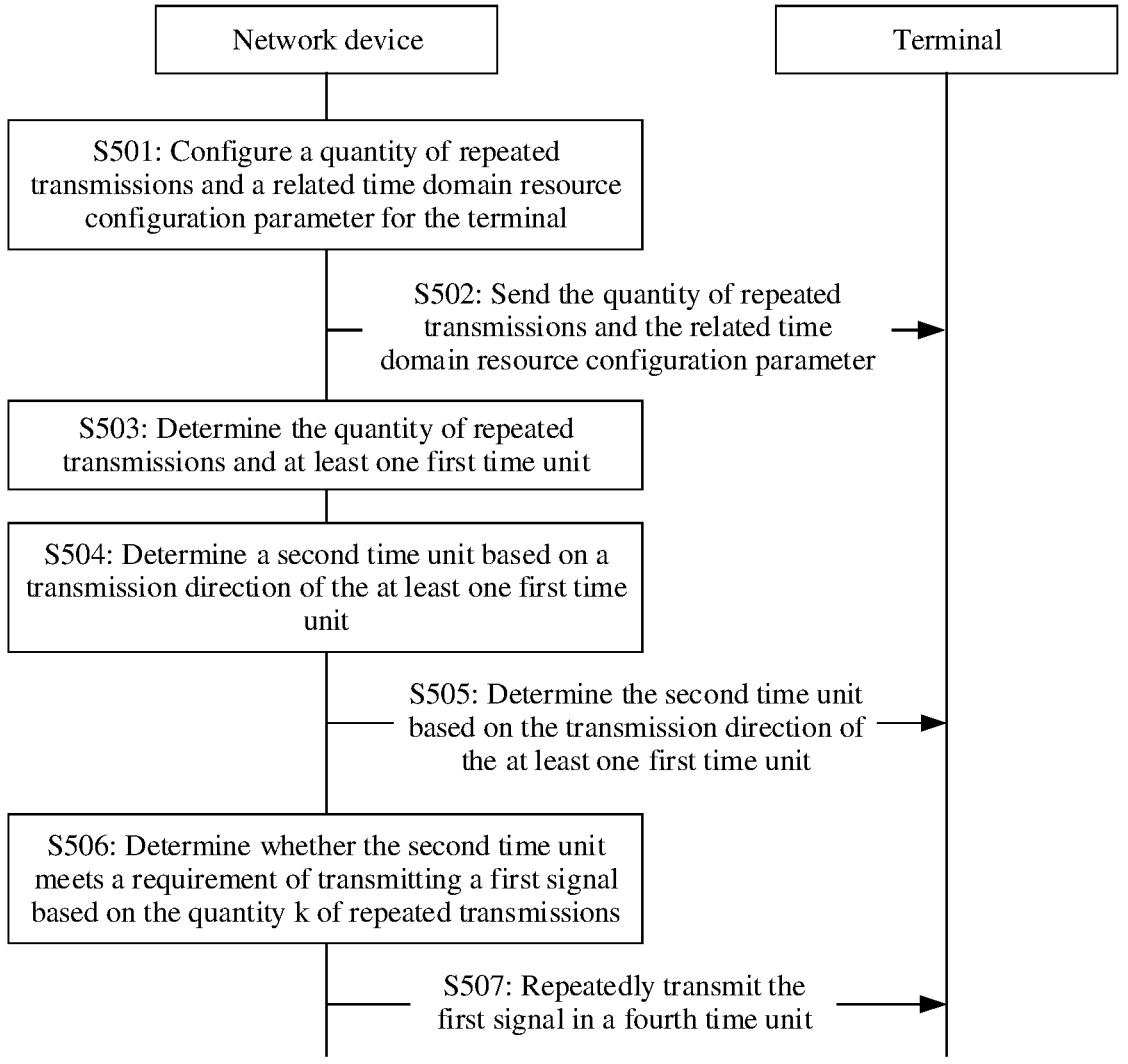
FIG. 5 is a schematic flowchart of a method for repeated downlink transmission according to an embodiment of this application.

FIG. 5 is a schematic flowchart of a method for repeated downlink transmission according to an embodiment of this application. As shown in FIG. 5, the method may include the following steps.

S501: A network device configures a quantity of repeated transmissions and a related time domain resource configuration parameter for a terminal.

S502: The network device sends the quantity of repeated transmissions and the related time domain resource configuration parameter to the terminal.

S503: The network device determines the quantity of repeated transmissions and at least one first time unit.

S504: The network device determines a second time unit based on a transmission direction of the at least one first time unit.

S505: The network device repeatedly transmits a first signal to the terminal in the second time unit.

The second time unit is a time unit that is all or a part of the at least one first time unit and that is used for transmission in a downlink transmission direction (that is, a second transmission direction). In other words, the second time unit may be understood as a time unit actually used to repeatedly transmit the first signal to the terminal, and the second time unit is a part of the at least one first time unit.

After the network device determines the at least one first time unit based on the quantity of repeated transmissions and the related time domain resource configuration parameter that are configured by the network device for the terminal, and then determines the at least one first time unit in S503, the network device may start to repeatedly transmit downlink data, namely, the first signal, to the terminal in the at least one first time unit (for example, a slot). However, in a process in which the first signal is repeatedly transmitted to the terminal, if a burst service arrives, the network device may schedule some time units (which may be slots or symbols) in the at least one first time unit to transmit a second signal in an uplink transmission direction (a first transmission direction), or to transmit a second signal with a higher priority in the downlink transmission direction. In this case, the network device may repeatedly send, based on scheduling of the network device, the first signal in a time unit (that is, the second time unit) that is in the at least one first time unit and that is used to transmit the first signal in the downlink transmission direction. In other words, the network device can repeatedly transmit the first signal to the terminal in the second time unit.

In some possible implementations, because in a processing of performing S505, some time units (for example, a fourth time unit) in the at least one first time unit may be scheduled by the network device for transmission in the uplink transmission direction or some time units (for example, a fifth time unit) may be scheduled to transmit the second signal with the higher priority in the downlink transmission direction, after repeatedly transmitting the first signal to the terminal in S505, the network device excludes the fourth time unit and/or the fifth time unit from the at least one first time unit, to determine the second time unit, that is, determine time units that are actually used to repeatedly transmit the first signal.

S506: The network device determines whether the second time unit meets a requirement of transmitting the first signal based on a quantity k of repeated transmissions. If the second time unit does not meet the requirement, S507 is performed, or if the second time unit meets the requirement, the procedure ends.

It should be noted that when the second time unit is a subunit of the first time unit, a quantity of time units required for transmitting the first signal based on the quantity of repeated transmissions may be understood as a total quantity of subunits of the first time unit that are occupied for repeatedly transmitting the first signal based on the configured quantity of repeated transmissions.

After repeatedly transmitting, in the second time unit, the first signal to the network device in S505, the network device may determine a time unit actually used to repeatedly transmit the first signal. Then, the network device may determine whether a quantity of time units required for performing repeated transmission in the downlink transmission direction based on the configured quantity k of repeated transmissions is greater than a quantity of second time units. If yes, it indicates that an actual quantity of repeated transmissions performed by the network device cannot reach k. In other words, the network device cannot complete k repeated transmissions in the downlink transmission direction in the at least one first time unit configured by the network device. In this case, the network device needs to continue repeated transmission in the downlink transmission direction in another time unit (for example, the fourth time unit) after the at least one time unit, until the quantity of repeated transmissions reaches k. Otherwise, it indicates that an actual quantity of repeated transmissions performed by the network device reaches k. In other words, the terminal can complete k repeated transmissions in the downlink transmission direction in the at least one first time unit configured by the network device for the terminal, so that after the network device receives the repeatedly transmitted first signal, a good combination gain is achieved, thereby improving a coverage enhancement effect.

In some possible implementations, the fourth time unit may be a time unit that is located after the at least one first time unit in time domain, and the fourth time unit may be a time unit such as a subframe, a slot, a mini-slot, or a symbol. This is not specifically limited in this embodiment of this application.

Further, the fourth time unit may be a time unit configured by the network device for the terminal for uplink transmission or downlink transmission, or may be a time unit not configured by the network device for the terminal. This is not specifically limited in this embodiment of this application.

S507: The network device repeatedly transmits the first signal to the terminal in the fourth time unit after the at least one first time unit.

If the network device cannot perform k repeated transmissions in the downlink transmission direction in the second time unit, the network device may continue to repeatedly transmit the first signal to the terminal in one or more time units (namely, the fourth time unit) after the at least one first time unit, until a quantity that the network device repeatedly transmits the first signal to the terminal in the second time unit and the fourth time unit reaches k. Herein, it may be understood that the network device repeatedly transmits the first signal to the terminal in the second time unit and the fourth time unit, and a total quantity of second time units and fourth time units is greater than or equal to the quantity of time units required for transmitting the first signal based on the quantity of repeated transmissions. Alternatively, it may be further understood that the network device repeatedly transmits the first signal to the terminal in the second time unit and the fourth time unit based on the configured quantity k of repeated transmissions.

In some possible implementations, the network device may further configure a transmission direction of each time unit. In this case, before performing S505, the network device can determine, in the at least one first time unit based on the transmission direction of each time unit, time units that are used for transmission in the uplink transmission direction, and time units that are used for transmission in the downlink transmission direction, to determine the second time unit. In this way, the network device may alternatively first perform S506, and then perform S505 and S507.

In some possible embodiments, after performing S507, the network device may further send a notification to the terminal, to notify the terminal that in addition to receiving the first signal in the second time unit, the terminal may further receive the first signal in the fourth time unit, to combine the received first signals, to obtain a good combination gain, and improve coverage enhancement performance.

Specifically, after S507, the network device may notify the terminal to continue to receive the first signal after the at least one first time unit. The method may further include: The network device sends a first indication message to the terminal, where the first indication message is used to configure the terminal to transmit (that is, receive) the first signal in a time unit after the first time unit. In this way, as described in the foregoing embodiment, when the quantity of repeated transmissions in the at least one first time unit does not reach k, in addition to receiving the first signal in the second time unit, the terminal may further receive the first signal in the fourth time unit.

Alternatively, after S507, the network device may notify the terminal to continue to receive the first signal in the fourth time unit after the at least one first time unit. The method may further include: The network device sends a second indication message to the terminal, where the second indication message indicates the terminal to repeatedly transmit (that is, receive) the first signal in the fourth time unit. In this way, as described in the foregoing embodiment, when the quantity of repeated transmissions in the at least one first time unit does not reach k, in addition to receiving the first signal in the second time unit, the terminal may further receive the first signal in the fourth time unit.

Figure 6:
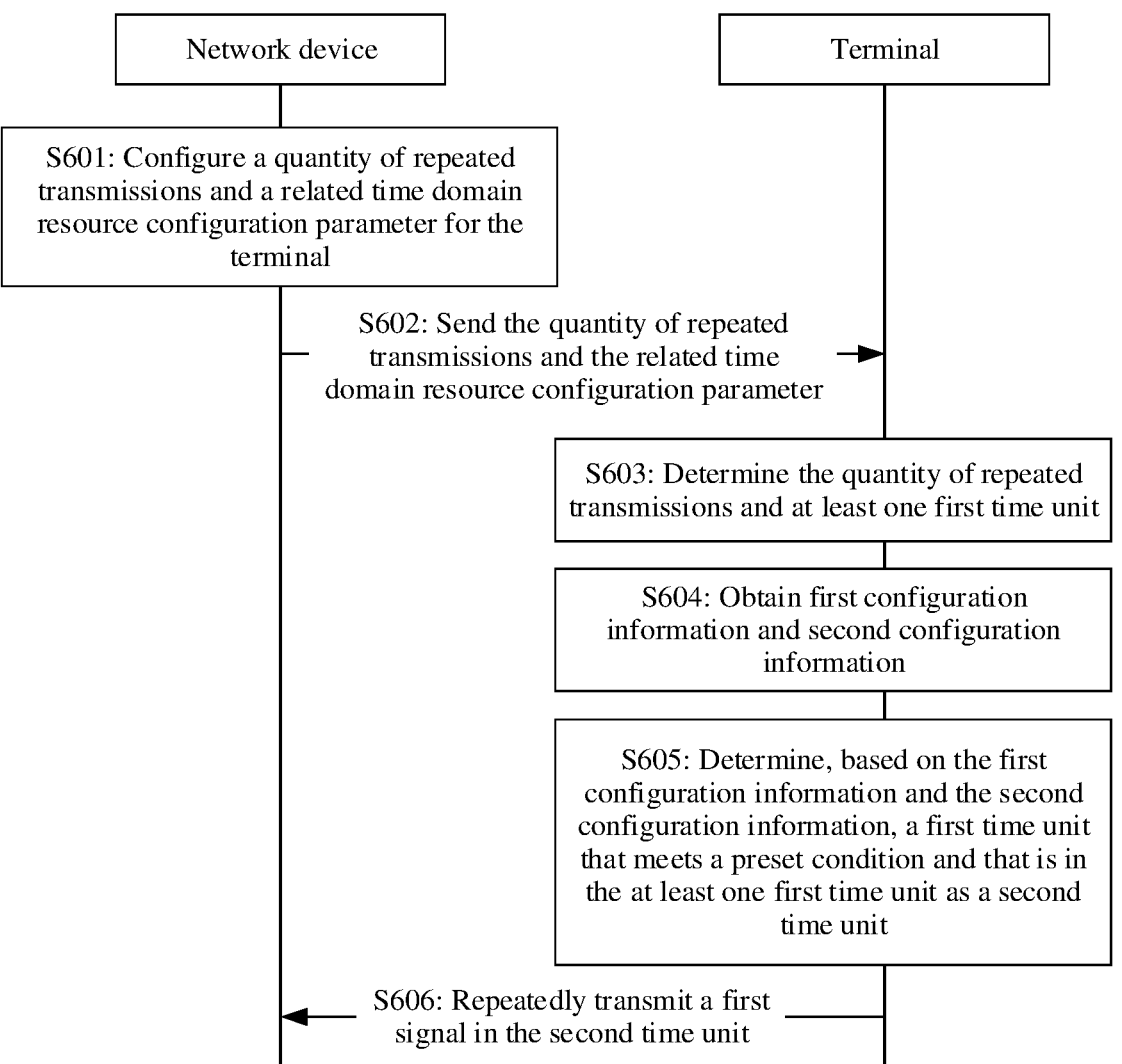
FIG. 6 is a schematic flowchart of still another method for repeated uplink transmission according to an embodiment of this application.

In some possible implementations, when a PUSCH mapping type is Type A, an embodiment of this application further provides a communication method, to resolve a problem that coverage enhancement performance is limited because an actual quantity of repeated transmissions is less than a configured quantity of repeated transmissions. In a repeated uplink transmission scenario, the method may be applied to the foregoing terminal. FIG. 6 is a schematic flowchart of still another method for repeated uplink transmission according to an embodiment of this application. The method may include the following steps.

S601: A network device configures a quantity of repeated transmissions and a related time domain resource configuration parameter for a terminal.

S602: The network device sends the quantity of repeated transmissions and the related time domain resource configuration parameter to the terminal.

S603: The terminal determines the quantity of repeated transmissions and at least one first time unit.

S604: The terminal obtains first configuration information and second configuration information.

For S601 to S604, refer to the descriptions of S401 to S404 in the foregoing embodiment. Details are not described herein again.

S605: The terminal determines, based on the first configuration information and the second configuration information, a first time unit that meets a preset condition and that is in the at least one first time unit as a second time unit.

Herein, after obtaining the first configuration information and the second configuration information, the terminal may determine a transmission direction of each first time unit, or may determine a format of the first time unit. In this case, when a PUSCH mapping type is Type A, and the first configuration information indicates a first format (that is, transmission in an uplink transmission direction is not performed in the first time unit only when the first time unit is completely used for transmission in a downlink transmission direction), the terminal may determine a time unit (for example, a slot) that meets the preset condition and that is in the first time unit (a slot) as the second time unit. For example, the terminal may select, as the second time unit, a time unit that is in a first time unit in a second format (that is, the first time unit is partially used for transmission in the downlink transmission direction) and whose actual code rate for transmitting a first signal is less than a preset code rate. Optionally, the preset code rate may be 1. Alternatively, the terminal may select, as the second time unit, a time unit (for example, a slot) that is in a first time unit (for example, a slot) in a second format and that has time units (for example, symbols), used for transmission in the uplink transmission direction, whose quantity is greater than or equal to a first threshold. Optionally, the first threshold may be a predefined quantity of time-domain symbols, or the first threshold may be a value [n×l] obtained by rounding n times a quantity l of time-domain symbols required for a single transmission of the first signal.

It may be understood that, based on the second configuration information, a time unit that corresponds to a first location in a single first time unit in the second format and that is partially used for transmission in the uplink transmission direction may not reach l. In other words, the first time unit is insufficient to complete one repeated uplink transmission. However, to improve resource utilization, if an actual code rate for transmitting the first signal in the first time unit can be less than the preset code rate (for example, 1), or if a quantity of time units that are in the first time unit and that are used for transmission in the uplink transmission direction is greater than or equal to the first threshold (for example, [n×l]), the terminal may determine the first time unit as the second time unit to transmit the first signal, to increase an actual quantity of repeated transmissions.

In this embodiment of this application, the first threshold may be a value ⌈n×l⌉ obtained by rounding up k times of l, or may be a value ⌊n×l⌋ obtained by rounding down n times of l. This is not specifically limited in this embodiment of this application.

During actual application, the preset condition may be another condition, provided that one repeated uplink transmission can be completed in a part that is in the first time unit in the second format and that is used for transmission in the uplink transmission direction. This is not specifically limited in this embodiment of this application.

S606: The terminal repeatedly transmits the first signal to the network device in the second time unit.

In some possible embodiments, after S606, if an actual quantity of repeated transmissions of the first signal still does not reach k, S206 and S207 or S406 and S407 may be further performed, so that the actual quantity of repeated transmissions of the first signal reaches k.

It can be learned from the foregoing that, resources that cannot be originally used for repeated uplink transmission are fully utilized, so that k repeated uplink transmissions of the first signal are completed in the at least one first time unit as much as possible. In this way, after the network device receives the repeatedly transmitted first signal, a good combination gain can be achieved, thereby improving a coverage enhancement effect.

Based on a same inventive concept, for a PUSCH mapping type being Type A, an embodiment of this application further provides a communication method. In a repeated uplink transmission scenario, the method may be applied to the foregoing terminal. FIG. 7 is a schematic flowchart of yet another method for repeated uplink transmission according to an embodiment of this application. The method may include the following steps.

S701: A network device configures a quantity of repeated transmissions and a related time domain resource configuration parameter for a terminal.

S702: The network device sends the quantity of repeated transmissions and the related time domain resource configuration parameter to the terminal.

S703: The terminal determines the quantity of repeated transmissions and at least one first time unit.

S704: The terminal determines at least one second time unit from the at least one first time unit.

A time unit corresponding to a first location in the second time unit includes a time unit used for transmission in a downlink transmission direction.

The terminal determines, as the second time unit, all or a part of the time units corresponding to the first location that are in the first time unit and that are used in the downlink transmission direction. For example, if the terminal determines the first time unit, for example, symbols 0 to 4 in slot 1 in slots 0 to 2 include symbol 2 used in the downlink transmission direction, the terminal determines slot 1 as the second time unit.

S705: The terminal determines whether an actual code rate for transmitting a first signal in the second time unit is less than a preset code rate. If yes, S706 is performed; or if not, the procedure ends.

S706: The terminal repeatedly transmits the first signal to the network device in the second time unit.

Herein, the terminal further determines the second time unit. If the actual code rate for transmitting the first signal in the second time unit is less than the preset code rate, for example, 1, the terminal may determine that the second time unit may be used for repeated transmission of the first signal. In this case, the terminal transmits the first signal to the network device in the second time unit, to complete one repeated transmission.

Further, the time unit that is in the first time unit and whose actual code rate for transmitting the first signal is less than the preset code rate may further include a time unit (for example, a slot) that is in the first time unit (for example, a slot) and that has time units (for example, symbols), used for an uplink transmission direction, whose quantity is greater than or equal to a first threshold. In this case, the terminal may further select, as the second time unit, the time unit (for example, the slot) that is in the first time unit (for example, the slot) and that has the time units (for example, the symbols), used for the uplink transmission direction, whose quantity is greater than or equal to the first threshold. Optionally, the first threshold may be a predefined quantity of time-domain symbols, or the first threshold may be a value [n×l] obtained by rounding n times a quantity 1 of time-domain symbols required for a single transmission of the first signal. In this way, when the second time unit is insufficient to complete one repeated uplink transmission, to improve resource utilization, if the actual code rate for transmitting the first signal in the second time unit can be less than the preset code rate (for example, 1), or if a quantity of time units that are in the second time unit and that are used for transmission in the uplink transmission direction is greater than or equal to the first threshold (for example, [n×l]), the terminal may use the second time unit to transmit the first signal, to increase an actual quantity of repeated transmissions.

In this embodiment of this application, the first threshold may be a value ⌈n×/⌉ obtained by rounding up k times of l, or may be a value ⌊n×/⌋ obtained by rounding down n times of l. This is not specifically limited in this embodiment of this application.

During actual application, that the actual code rate for transmitting the first signal is less than the preset code rate may be another case, provided that one repeated uplink transmission can be completed in a part that is in the second time unit and that is used for transmission in the uplink transmission direction. This is not specifically limited in this embodiment of this application.

For example, still refer to FIG. 3. The network device configures, for the terminal, that a PUSCH mapping type is Type A, s=symbol 0 in slot 0, l=5, and k=3. In other words, the network device indicates the terminal to perform three repeated transmissions in symbol 0 to symbol 4 in each of slot 0 to slot 2 (three slots in total). In this case, after receiving the configuration information, the terminal may first determine at least one first time unit (namely, slot 0 to slot 2) and a quantity k of repeated transmissions being equal to 3, the terminal obtains the configuration of the network device, and determines that symbols 2, 4, and 5 in the slot 1 are used for transmission in the downlink transmission direction. In this case, the terminal may determine slot 1 as the second time unit. Further, the terminal determines whether an actual code rate for transmitting the first signal in slot 1 is less than 1. If yes, the terminal may transmit the first signal to the network device in slot 1, to implement one repeated transmission. Otherwise, the terminal may exclude slot 1, and cannot send the first signal to the network device in slot 0.

In some possible embodiments, after S706, if an actual quantity of repeated transmissions of the first signal still does not reach k, S206 and S207 or S406 and S407 may be further performed, so that the actual quantity of repeated transmissions of the first signal reaches k.

It can be learned from the foregoing that, resources that cannot be originally used for repeated uplink transmission are fully utilized, so that k repeated uplink transmissions of the first signal are completed in the at least one first time unit as much as possible. In this way, after the network device receives the repeatedly transmitted first signal, a good combination gain can be achieved, thereby improving a coverage enhancement effect.

It should be noted that, in all the foregoing implementations, the terminal device finally determines k time units actually used to transmit the first signal. It can be learned from the foregoing embodiments that the k time units actually used to transmit the first signal include the at least one second time unit (which may also be denoted as a third time unit) and a fourth time unit. The k time units may be consecutive or not consecutive in time domain.

After determining the k time units actually used to transmit the first signal, the terminal device may transmit, according to the following rules, data transmitted in the k time units.

Rule 1: A redundancy version (redundancy version, RV) sequence used by an $i^{th}$ piece of data in the k time units is an $i^{th}$ RV in a first RV sequence.

The first RV sequence may be predefined, for example, {0231}.

The first RV sequence may be preconfigured by using higher layer signaling RRC, for example, configured as {0303}.

The first RV sequence may be determined based on indication information in DCI, and may meet a first-to-last cycle of 0231. To be specific, if the DCI indicates that a first RV is 2, the first RV sequence is 2310. If the DCI indicates that a first RV is 3, the first RV sequence is 3102.

Rule 2: The data transmitted in the k time units is transmitted in a frequency hopping manner.

When a channel condition corresponding to a frequency domain resource is poor, if all data is scheduled on the frequency domain resource for receiving and sending, a probability of a data communication error is greatly increased. Therefore, resources for data communication can be dispersed in frequency domain, to effectively reduce impact of the frequency domain resource with the poor channel condition on entire data communication. In other words, a frequency domain diversity gain may be obtained in the foregoing manner. A specific implementation of obtaining the frequency domain diversity gain is frequency hopping. For example, if there is no frequency hopping, frequency domain resources originally used for data communication in a time period are RB0 to RB7, and there are eight RBs in total. If a frequency hopping technology is used, the time period may be divided into two time periods that are adjacent in time: a time period 1 and a time period 2. In the time period 1, frequency domain resources used for data communication are RB0 to RB7, and in the time period 2, frequency domain resources used for data communication are RB80 to RB87, to obtain the frequency domain diversity gain. In this application, RBn represents an RB whose index is n. For example, RB0, RB7, RB80, and RB87 herein represent RBs whose indexes are 0, 7, 80, and 87 respectively.

Further, frequency hopping for uplink communication specifically includes intra-slot frequency hopping and inter-slot frequency hopping. This application mainly focuses on inter-slot frequency hopping. In other words, it is determined that k time units are k slots, and how to perform frequency hopping on data in the k slots is determined. Specifically, in the k time units, a location of a frequency domain resource of data in an $i^{th}$ time unit may be determined based on the following formula, where a value of i is i=0, 1, . . . , or k−1:

$$RB_{start}(i) = \begin{cases} RB_{start} & i\bmod 2 = 0 \\ (RB_{start} + RB_{offset})\bmod N & i\bmod 2 = 1 \end{cases}$$

$RB_{start}$ is a start location of the frequency domain resource, $RB_{offset}$ is a frequency domain offset, $RB_{offset}$ is an integer greater than or equal to 0, N is a quantity of RBs of a bandwidth part, and i is less than or equal to the quantity of repeated transmissions.

For a dynamically scheduled PUSCH and a configured grant type 2, $RB_{start}$ is indicated by using the indication information in the DCI. Specifically, a start location of a frequency domain resource indicated by a resource indication value (resource indication value, RIV) is $RB_{offset}$, and $RB_{offset}$ is an integer greater than or equal to 0. The $RB_{start}$ may be specifically configured by using higher layer configuration information, for example, configured by using RRC signaling.

N is a quantity of RBs in a downlink bandwidth part (bandwidth part, BWP). i is a serial number of a transmission. For example, in the formula (9), when i mod 2=0, that is, a frequency domain start location of an even-numbered transmission is a start location indicated by the RIV in the DCI.

When i mod 2=1, that is, a frequency domain start location corresponding to a frequency domain resource of an odd-numbered transmission needs to be increased by the frequency domain offset $RB_{offset}$. A value of $RB_{offset}$ may be determined comprehensively by using configuration information and the DCI. For example, the terminal device receives the configuration information sent by the network device, where the configuration information is used to configure a plurality of values of $RB_{offset}$, and the DCI includes an indication field, indicating that one of the plurality of values of $RB_{offset}$ is $RB_{offset}$ in a second hop.

Alternatively, the foregoing frequency hopping manner may also be referred to as frequency hopping between a plurality of repetitions, that is, inter-repetition frequency hopping.

Specifically, whether the terminal device supports this frequency hopping manner is indicated by sending indication information. For example, the indication information is carried in RRC signaling, to indicate that this frequency hopping manner is used, and a frequency domain resource of each hop is determined in the foregoing manner.

In another optional manner, the terminal device may determine M consecutive first time units based on the k time units actually used to transmit the first signal. A specific determining manner is as follows:

A first time unit of the M consecutive time units is:
a first time unit in the k time units or a first first time unit in the at least one first time unit.

A last time unit of the M consecutive time units is:
a last time unit in the k time units or an $H^{th}$ time unit after the last time unit in the k time units, where all time units from the last time unit in the k time units to the $H^{th}$ time unit are used in the second transmission direction, or some time units are used in the second transmission direction, which is opposite to a transmission direction of the first signal. For descriptions of a specific transmission direction of the time unit, refer to the foregoing descriptions. Details are not described again.

After determining the M consecutive time units, the terminal device may perform transmission in the M consecutive time units according to the foregoing rule 1 and rule 2, provided that the k time units are replaced with the M consecutive time units.

Because the terminal has a capability of processing the M consecutive time units, the k time units are changed to the M time units in the foregoing manner for processing. This can reduce complexity of implementation of the terminal, and reduce costs.

Figure 8:
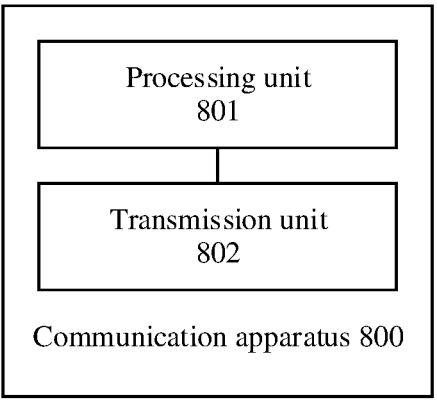
FIG. 8 is a schematic diagram of a structure of a communication apparatus according to an embodiment of this application.

Based on a same inventive concept, an embodiment of this application provides a communication apparatus. The apparatus may be a chip or a system on chip in a communication device (such as the terminal or the network device in the foregoing one or more embodiments) in a wireless communication system, or may be a functional module that is in the communication device and that is configured to implement the method in the embodiment in FIG. 7. For example, FIG. 8 is a schematic diagram of a structure of a communication apparatus according to an embodiment of this application. As shown in FIG. 8, the communication apparatus 800 may include a processing unit 801 and a transmission unit 802.

In this embodiment of this application, the processing unit 801 is configured to obtain at least one first time unit, where the at least one first time unit is configured to perform repeated transmission in a first transmission direction at a first location based on a quantity of repeated transmissions, the at least one first time unit includes at least one second time unit, and a time unit corresponding to the first location in the second time unit includes a time unit used for transmission in a second transmission direction. The transmission unit 802 is configured to: if an actual code rate for transmitting a first signal in the second time unit is less than a preset code rate, transmit the first signal in the second time unit.

In some possible implementations, that the actual code rate for sending the first signal in the second time unit is less than the preset code rate specifically includes: A quantity of time-domain symbols included in the time unit corresponding to the first location is greater than or equal to a first threshold.

In some other possible implementations, the first threshold is a predefined quantity of time-domain symbols; or the first threshold is a value [n×l] obtained by rounding n times a quantity l of time-domain symbols required for a single transmission of the first signal, where n is a predefined value.

In some other possible implementations, the first time unit is a slot, the second time unit is a slot, and a time unit that is in the second time unit and that is used in the first transmission direction includes at least one time-domain symbol.

In some other possible implementations, the first transmission direction is an uplink transmission direction, and the second transmission direction is a downlink transmission direction; or the first transmission direction is a downlink transmission direction, and the second transmission direction is an uplink transmission direction.

In another embodiment of this application, the communication apparatus may be a chip or a system on chip in a communication device (for example, a terminal or a network device), or may be a functional module that is in the communication device and that is configured to implement any method in the embodiments in FIG. 2 to FIG. 6. For example, still refer to FIG. 8. The processing unit 801 is further configured to determine a third time unit based on a transmission direction of at least one first time unit, where the at least one first time unit is configured to transmit a first signal in a first transmission direction based on a quantity of repeated transmissions, and the third time unit includes all or a part of time units that are in the at least one first time unit and that are used for transmission in the first transmission direction. The transmission unit 802 is configured to repeatedly transmit the first signal in the third time unit; and if the third time unit does not meet a requirement of transmitting the first signal based on the quantity of repeated transmissions, transmit the first signal in a fourth time unit, where the fourth time unit is located after the at least one first time unit in time domain, and the third time unit and the fourth time unit meet the requirement of transmitting the first signal based on the quantity of repeated transmissions.

In some possible implementations, the processing unit 801 is specifically configured to determine a time unit that is in the at least one first time unit and whose transmission direction is the first transmission direction as the third time unit.

In some other possible implementations, the processing unit 801 is specifically configured to determine a time unit that is in the at least one first time unit and that meets a preset condition as the third time unit, where the preset condition includes: an actual code rate for transmitting the first signal in the first time unit is less than a preset code rate, a time unit corresponding to a first location in the first time unit includes a time unit used for transmission in a second transmission direction, and the time unit corresponding to the first location is configured to be used for repeated transmission in the first transmission direction; or a quantity of time units that are in the first time unit and that are used for transmission in the first transmission direction is greater than or equal to a first threshold.

In some other possible implementations, that the third time unit does not meet the requirement of transmitting the first signal based on the quantity of repeated transmissions includes: A quantity of third time units is less than or equal to a second threshold, where the second threshold is a quantity of time units required for transmitting the first signal based on the quantity of repeated transmissions.

In some other possible implementations, the processing unit 801 is specifically configured to obtain first configuration information, where the first configuration information indicates a format of a time unit; and determine, based on the first configuration information, a first time unit in a first format in the at least one first time unit as the third time unit; or determine, based on the first configuration information, a first time unit in a second format in the at least one first time unit as the third time unit, where the first time units in the first format are all used in the first transmission direction, and the first time units in the second format are partially used in the first transmission direction.

In some other possible implementations, the first transmission direction is an uplink transmission direction, and the second transmission direction is a downlink transmission direction; or the first transmission direction is a downlink transmission direction, and the second transmission direction is an uplink transmission direction.

In some other possible implementations, the processing unit 801 is further configured to obtain a first indication message before transmitting the first signal in the fourth time unit, where the first indication message is used to configure transmission of the first signal in a time unit after the first time unit.

In some other possible implementations, the processing unit 801 is further configured to send a second indication message, where the second indication message indicates to repeatedly transmit the first signal in the fourth time unit.

It should be noted that the processing unit 801 may be one or more processors, and the transmission unit 802 may be a transceiver interface, a transceiver circuit, a transceiver, or the like.

For example, still refer to FIG. 8. In some embodiments, the processing unit 801 may be configured to determine a third time unit and a fourth time unit, where the third time unit includes all or a part of time units that are in at least one first time unit and that are used for transmission in a first transmission direction, the at least one first time unit is configured to transmit a first signal in the first transmission direction based on a quantity of repeated transmissions, the fourth time unit is located after the at least one first time unit in time domain, and the third time unit and the fourth time unit meet a requirement of transmitting the first signal based on the quantity of repeated transmissions. The transmission unit 802 is configured to repeatedly transmit the first signal in the third time unit and the fourth time unit.

In some other possible implementations, the third time unit and the fourth time unit include k time units, redundancy versions RVs of a first signal transmitted in the k time units each are an RV in an RV sequence, and k is the quantity of repeated transmissions.

In some other possible implementations, an RV of the first signal transmitted in an $i^{th}$ time unit in the k time units is an $i^{th}$ RV in the RV sequence, and i is less than or equal to a total quantity of RVs in the RV sequence.

In some other possible implementations, the RV sequence is a predefined sequence or a sequence preconfigured by using higher layer signaling.

In some other possible implementations, the third time unit and the fourth time unit include k time units, frequency domain resources used to repeatedly transmit the first signal in the k time units are different, and k is the quantity of repeated transmissions.

In some other possible implementations, a location of a frequency domain resource used to repeatedly transmit the first signal in an $i^{th}$ time unit in the k time units satisfies the following formula:

$$RB_{start}(i) = \begin{cases} RB_{start} & i \bmod 2 = 0 \\ (RB_{start} + RB_{offset}) \bmod N & i \bmod 2 = 1 \end{cases}$$

$RB_{start}$ is a start location of the frequency domain resource, $RB_{offset}$ is a frequency domain offset, $RB_{offset}$ is an integer greater than or equal to 0, N is a quantity of RBs of a bandwidth part, and i is less than or equal to the quantity of repeated transmissions.

In some other possible implementations, the processing unit 801 is further configured to determine M consecutive first time units based on the third time unit and the fourth time unit, where M is greater than the quantity of repeated transmissions.

In some other possible implementations, the third time unit and the fourth time unit include k time units, and a first time unit in the M consecutive time units is a first time unit in the k time units or a first first time unit in the at least one first time unit. A last time unit in the M consecutive time units is a last time unit in the k time units or an $H^{th}$ time unit after the last time unit in the k time units, all time units from the last time unit in the k time units to the $H^{th}$ time unit are used in a second transmission direction, the second transmission direction is different from the first transmission direction, and H is a positive integer.

Based on a same inventive concept, an embodiment of this application further provides a communication device, including a non-volatile memory and a processor that are coupled to each other. The processor invokes program code stored in the memory to perform the communication method according to any one of the foregoing embodiments.

In this application, the communication device may be a terminal or a network device in a wireless communication system.

Based on a same inventive concept, an embodiment of this application provides a computer-readable storage medium. The computer-readable storage medium stores instructions. When the instructions are run on a computer, the communication method according to any one of the foregoing embodiments is performed.

Based on a same inventive concept, an embodiment of this application provides a computer program or a computer program product. When the computer program or the computer program product is executed on a computer, the computer is enabled to implement the communication method according to any one of the foregoing embodiments.

A person skilled in the art can appreciate that functions described with reference to various illustrative logical blocks, modules, and algorithm steps disclosed and described herein may be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the above should also be included within the scope of the computer-readable medium.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this disclosure to emphasize functional aspects of devices configured to perform the disclosed techniques, but do not necessarily require realization by different hardware units. Actually, as described above, various units may be combined into a codec hardware unit in combination with appropriate software and/or firmware, or may be provided by interoperable hardware units (including the one or more processors described above).

In the foregoing embodiments, the description of each embodiment has respective focuses. For a part that is not described in detail in an embodiment, refer to related descriptions in other embodiments.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

determining a quantity of repeated transmissions and at least one first slot, the at least one first slot is configured for transmission of a first signal in an uplink transmission direction based on the quantity of repeated transmissions;

determining at least one second slot based on a transmission direction of the at least one first slot, by excluding one or more slots having one or more symbols configured for transmission in a downlink transmission direction from the at least one first slot; and repeatedly transmitting the first signal in the at least one second slot and a fourth slot, in response to the at least one second slot failing to meet a requirement of transmitting the first signal based on the quantity of repeated transmissions, wherein the fourth slot is after the at least one first slot in a time domain, and the at least one second slot and the fourth slot meet the requirement of transmitting the first signal based on the quantity of repeated transmissions.

2. The communication method according to claim 1, further comprising:

determining the at least one second slot fails to meet the requirement of transmitting the first signal based on the quantity of repeated transmissions in response to a quantity of one or more second slots including the at least one second slot being less than or equal to a second threshold, wherein the second threshold is a quantity of slots required for transmitting the first signal based on the quantity of repeated transmissions.

3. The communication method according to claim 1, further comprising:

determining the at least one first slot, based on a quantity of repeated transmissions k, a start location of a slot for a single transmission s, and a time length of the single transmission l, wherein a first transmission of the first signal is a physical uplink shared channel (PUSCH), a first transmission mapping type of the first transmission is a Type A, and the repeated transmissions are located at s to s+l symbols in each of k slots.

4. The communication method according to claim 1, further comprising:

determining M consecutive first slots of one or more first slots including the at least one first slot based on the second slot and the fourth slot, wherein M is greater than the quantity of repeated transmissions.

5. The communication method according to claim 1, further comprising:

obtaining a first indication message, wherein the first indication message is used to configure transmission of the first signal in a third slot after the at least one first slot.

6. The communication method according to claim 1, further comprising:

sending a second indication message, wherein the second indication message indicates to repeatedly transmit the first signal in the fourth slot.

7. A communication apparatus, comprising:

at least one processor; and a memory storing programming instructions that, when executed by the at least one processor, cause the communication apparatus to:

determine a quantity of repeated transmissions and at least one first slot, the at least one first slot is configured for transmission of a first signal in an uplink transmission direction based on the quantity of repeated transmissions;

determine at least one second slot based on a transmission direction of the at least one first slot, by excluding one or more slots having one or more symbols configured for transmission in a downlink transmission direction from the at least one first slot; and repeatedly transmit the first signal in the at least one second slot and a fourth slot, in response to the at least one second slot failing to meet a requirement of transmitting the first signal based on the quantity of repeated transmissions, wherein the fourth slot is after the at least one first slot in a time domain, and the at least one second slot and the fourth slot meet the requirement of transmitting the first signal based on the quantity of repeated transmissions.

8. The communication apparatus according to claim 7, wherein the communication apparatus is further caused to:

determine the at least one second slot fails to meet the requirement of transmitting the first signal based on the quantity of repeated transmissions in response to a quantity of one or more second slots including the at least one second slot being less than or equal to a second threshold, wherein the second threshold is a quantity of slots required for transmitting the first signal based on the quantity of repeated transmissions.

9. The communication apparatus according to claim 7, wherein the communication apparatus is further caused to:

determine the at least one first slot, based on a quantity of repeated transmissions k, a start location of a slot for a single transmission s, and a time length of the single transmission l, wherein a first transmission of the first signal is a physical uplink shared channel (PUSCH), a first transmission mapping type of the first transmission is a Type A, and the repeated transmissions are located at s to s+l symbols in each of k slots.

10. The communication apparatus according to claim 7, wherein the communication apparatus is further caused to:

determine M consecutive first slots of one or more first slots including the at least one first slot based on the second slot and the fourth slot, wherein M is greater than the quantity of repeated transmissions.

11. The communication apparatus according to claim 7, wherein the communication apparatus is further caused to:

obtain a first indication message, wherein the first indication message is used to configure transmission of the first signal in a third slot after the at least one first slot.

12. The communication apparatus according to claim 7, wherein the communication apparatus is further caused to:

send a second indication message, wherein the second indication message indicates to repeatedly transmit the first signal in the fourth slot.

13. The communication apparatus according to claim 7, wherein the apparatus is a terminal, a network device, a chip or a system on chip in the terminal, or a system on chip in the network device.

14. A non-transitory computer-readable storage medium having instructions stored thereon that, when executed by a processor, cause an apparatus to:

determine a quantity of repeated transmissions and at least one first slot, the at least one first slot is configured for transmission of a first signal in an uplink transmission direction based on the quantity of repeated transmissions;

determine at least one second slot based on a transmission direction of the at least one first slot, by excluding one or more slots having one or more symbols configured for transmission in a downlink transmission direction from the at least one first slot; and repeatedly transmit the first signal in the at least one second slot and a fourth slot, in response to the at least one second slot failing to meet a requirement of transmitting the first signal based on the quantity of repeated transmissions, wherein the fourth slot is after the at least one first slot in a time domain, and the at least one second slot and the fourth slot meet a requirement of transmitting the first signal based on the quantity of repeated transmissions.

15. The non-transitory computer-readable storage medium according to claim 14, wherein the apparatus is further caused to:

determine the at least one second slot fails to meet the requirement of transmitting the first signal based on the quantity of repeated transmissions in response to a quantity of one or more second slots including the at least one second slot being less than or equal to a second threshold, wherein the second threshold is a quantity of slots required for transmitting the first signal based on the quantity of repeated transmissions.

16. The non-transitory computer-readable storage medium according to claim 14, wherein the apparatus is further caused to:

determine the at least one first slot based on the quantity of repeated transmissions k, a start location of a slot for a single transmission s, and a time length of the single transmission l, wherein a first transmission of the first signal is a physical uplink shared channel (PUSCH), a first transmission mapping type of the first transmission is Type A, and the repeated transmissions are located at s to s+l symbols in each of k slots.

17. The non-transitory computer-readable storage medium according to claim 14, wherein the apparatus is further caused to:

determine M consecutive first slots of one or more first slots including the at least one first slot based on the at least one second slot and the fourth slot, wherein M is greater than the quantity of repeated transmissions.

18. The non-transitory computer-readable storage medium according to claim 14, wherein the apparatus is further caused to:

obtain a first indication message, wherein the first indication message is used to configure transmission of the first signal in a third slot after the at least one first slot.

19. The non-transitory computer-readable storage medium according to claim 14, wherein the apparatus is further caused to:

send a second indication message, wherein the second indication message indicates to repeatedly transmit the first signal in the fourth slot.

* * * * *